United States Patent
Jin et al.

(10) Patent No.: US 12,206,724 B2
(45) Date of Patent: Jan. 21, 2025

(54) STORAGE DEVICES, METHODS OF OPERATING STORAGE DEVICES, AND STREAMING SYSTEMS INCLUDING STORAGE DEVICES

(71) Applicant: Samsung Electronics Co., Ltd., Suwon-si (KR)

(72) Inventors: Sang-Hwa Jin, Suwon-si (KR); Min-Ho Kim, Suwon-si (KR); Dongouk Moon, Suwon-si (KR); Soo-Young Ji, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/314,341

(22) Filed: May 9, 2023

(65) Prior Publication Data

US 2023/0421513 A1  Dec. 28, 2023

(30) Foreign Application Priority Data

Jun. 24, 2022 (KR) .......................... 10-2022-0077544

(51) Int. Cl.
*H04L 65/80* (2022.01)
*H04L 49/90* (2022.01)
*H04L 65/61* (2022.01)

(52) U.S. Cl.
CPC .............. *H04L 65/80* (2013.01); *H04L 49/90* (2013.01); *H04L 65/61* (2022.05)

(58) Field of Classification Search
CPC ......... H04L 49/90; H04L 65/61; H04L 65/80; H04L 65/60; H04L 45/02; H04L 47/125; H04L 67/02; H04L 69/162

See application file for complete search history.

(56) References Cited

U.S. PATENT DOCUMENTS

| | | | |
|---|---|---|---|
| 8,842,629 B2 * | 9/2014 | Qin | H04W 72/21 370/329 |
| 10,701,119 B2 | 6/2020 | Oyman | |
| 10,893,086 B2 | 1/2021 | Ljung et al. | |
| 10,893,100 B2 | 1/2021 | Jamjoom et al. | |

(Continued)

FOREIGN PATENT DOCUMENTS

| | | | | |
|---|---|---|---|---|
| CN | 105516312 A | * | 4/2016 | ............ H04W 84/00 |
| JP | H09102924 A | * | 4/1997 | |

(Continued)

OTHER PUBLICATIONS

Barakabitze et al. "QoE Management of Multimedia Streaming Services in Future Networks: A Tutorial and Survey" EEE Communications Surveys & Tutorials 22(1):526-565 (2020).

(Continued)

*Primary Examiner* — Oanh Duong
(74) *Attorney, Agent, or Firm* — Myers Bigel, P.A.

(57) ABSTRACT

A storage device includes a nonvolatile memory device, and a storage controller configured to control the nonvolatile memory device. The storage controller includes: (i) a quality of experience (QoE) manager configured to schedule a request received from an external user equipment, based on storage device information and network information, and (ii) a software-defined networking (SDN) manager configured to set a network transfer path to the external user equipment, which is associated with video data corresponding to the request.

20 Claims, 19 Drawing Sheets

(56) References Cited

U.S. PATENT DOCUMENTS

| | | | |
|---|---|---|---|
| 10,992,577 B2 | 4/2021 | Mutnuru et al. | |
| 11,128,560 B2 | 9/2021 | Joshi et al. | |
| 11,184,650 B1 | 11/2021 | Muthiah | |
| 2015/0071123 A1 | 3/2015 | Sabaa | |
| 2015/0195745 A1* | 7/2015 | Farmanbar | H04W 24/02 370/236 |
| 2015/0271231 A1* | 9/2015 | Luby | H04L 65/60 709/231 |
| 2017/0171589 A1* | 6/2017 | Phillips | G11B 27/10 |
| 2017/0317991 A1* | 11/2017 | Lionetti | G06F 3/0647 |
| 2020/0053411 A1 | 2/2020 | Yamagishi et al. | |
| 2020/0084253 A1* | 3/2020 | Ljung | H04L 65/65 |
| 2020/0314694 A1* | 10/2020 | Yu | H04L 49/70 |
| 2021/0195271 A1 | 6/2021 | D'Acunto et al. | |
| 2021/0195499 A1* | 6/2021 | Gibbon | H04W 48/18 |
| 2021/0303189 A1* | 9/2021 | Bae | G06F 3/061 |
| 2022/0001279 A1 | 1/2022 | Colenbrander | |
| 2022/0045959 A1 | 2/2022 | Chauhan | |
| 2022/0188021 A1 | 6/2022 | Park | |

FOREIGN PATENT DOCUMENTS

| | | |
|---|---|---|
| JP | 2018527769 A | 9/2018 |
| KR | 20160005253 A | 1/2016 |
| KR | 20190088052 A | 7/2019 |
| KR | 20190128630 A | 11/2019 |
| KR | 20200051450 A | 5/2020 |
| KR | 20220084844 A | 6/2022 |

OTHER PUBLICATIONS

Petrangeli "QoE-Centric Network-Assisted Delivery of Adaptive Video Streaming Services" (Revised Jun. 9, 2022).

* cited by examiner

FIG. 7A

| Request | UE | ID | Quality | CODEC | Priority |
|---------|-----|-----|---------|-------|----------|
| RQ1 | UE1 | ID1 | Q1 | C1 | LV1 |
| RQ2 | UE2 | ID2 | Q2 | C2 | LV2 |
| RQ3 | UE3 | ID1 | Q3 | C3 | LV3 |

| Request | UE | ID | Quality | CODEC | Priority |
|---|---|---|---|---|---|
| RQ1 | UE1 | ID1 | Q1 | C1 | LV1 |
| RQ2 | UE2 | ID2 | Q2 | C2 | LV2 |
| RQ3 | UE3 | ID3 | Q3 | C3 | LV3 |

STORAGE DEVICES, METHODS OF OPERATING STORAGE DEVICES, AND STREAMING SYSTEMS INCLUDING STORAGE DEVICES

REFERENCE TO PRIORITY APPLICATION

This application claims priority under 35 U.S.C. § 119 to Korean Patent Application No. 10-2022-0077544, filed Jun. 24, 2022, the disclosure of which is hereby incorporated herein by reference.

BACKGROUND

Embodiments of the present disclosure described herein relate to semiconductor memory devices, and more particularly, to storage devices, methods of operating storage devices, and streaming systems including storage devices.

A semiconductor memory device is typically classified as a volatile memory device, in which stored data disappears when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

A flash memory-based storage device is typically used as a high-capacity storage medium of a computing system. A typical storage device has a function of storing data under control of a host device. Nowadays, to reduce the burden of computation (or calculation) of the host device, enhanced storage devices are being developed that support various computations or various applications therein, which were previously performed by the host device.

A streaming system may provide a multimedia of internet video by using various protocols such as hypertext transfer protocol (HTTP) streaming. The protocol that provides the HTTP-based transfer of video streaming may include a dynamic adaptive streaming over HTTP (DASH).

SUMMARY

Embodiments of the present disclosure provide a storage device having improved quality of experience (QoE), an operating method of the storage device, and a streaming system including the storage device.

According to an embodiment, a storage device includes a nonvolatile memory device, and a storage controller that controls the nonvolatile memory device. The storage controller includes a quality of experience (QoE) manager, which schedules a request received from an external user equipment based on storage device information and network information, and a software-defined networking (SDN) manager, which sets a network transfer path to the external user equipment that is associated with video data corresponding to the request.

According to another embodiment, a method of operating a storage device having a nonvolatile memory device and a storage controller therein includes: (i) receiving a request requiring video data and provided from an external user equipment, (ii) scheduling the request based on network information and storage device information, (iii) reading the video data corresponding to the request from the nonvolatile memory device, (iv) determining a network transfer path to the external user equipment, which is associated with the video data, and (v) sending a response including the video data to the external user equipment.

According to a further embodiment, a streaming system includes a network that includes a plurality of switches, each including an SDN data plane, a user equipment configured to send a request requiring video data over the network, a streaming server that is connected with the user equipment over the network, and a storage device that includes an SDN control plane, The storage device is connected with the user equipment over the network, is connected with the streaming server through a given interface, and sends video data corresponding to the request to the user equipment. The storage device schedules the request based on network information and storage device information, the SDN control plane sets a transfer path of the video data to generate network connection information, and the SDN data plane establishes a connection between the user equipment and the storage device based on the network connection information.

BRIEF DESCRIPTION OF THE FIGURES

The above and other objects and features of the present disclosure will become apparent by describing in detail embodiments thereof with reference to the accompanying drawings.

FIGS. 7A and 7B are diagrams for describing an operation of a QoE manager of FIG. 2.

DETAILED DESCRIPTION

Below, embodiments of the present disclosure will be described in detail and clearly to such an extent that an ordinary one in the art easily implements the invention.

Hereinafter, for convenience of description, the terms "image", "video data", "content", "media", "media content", and "multimedia file" are used interchangeably. The terms may have the same meaning or different meanings depending on the context of embodiments, and a meaning of each term may be understood depending on the context of embodiments to be described.

Figure 1:
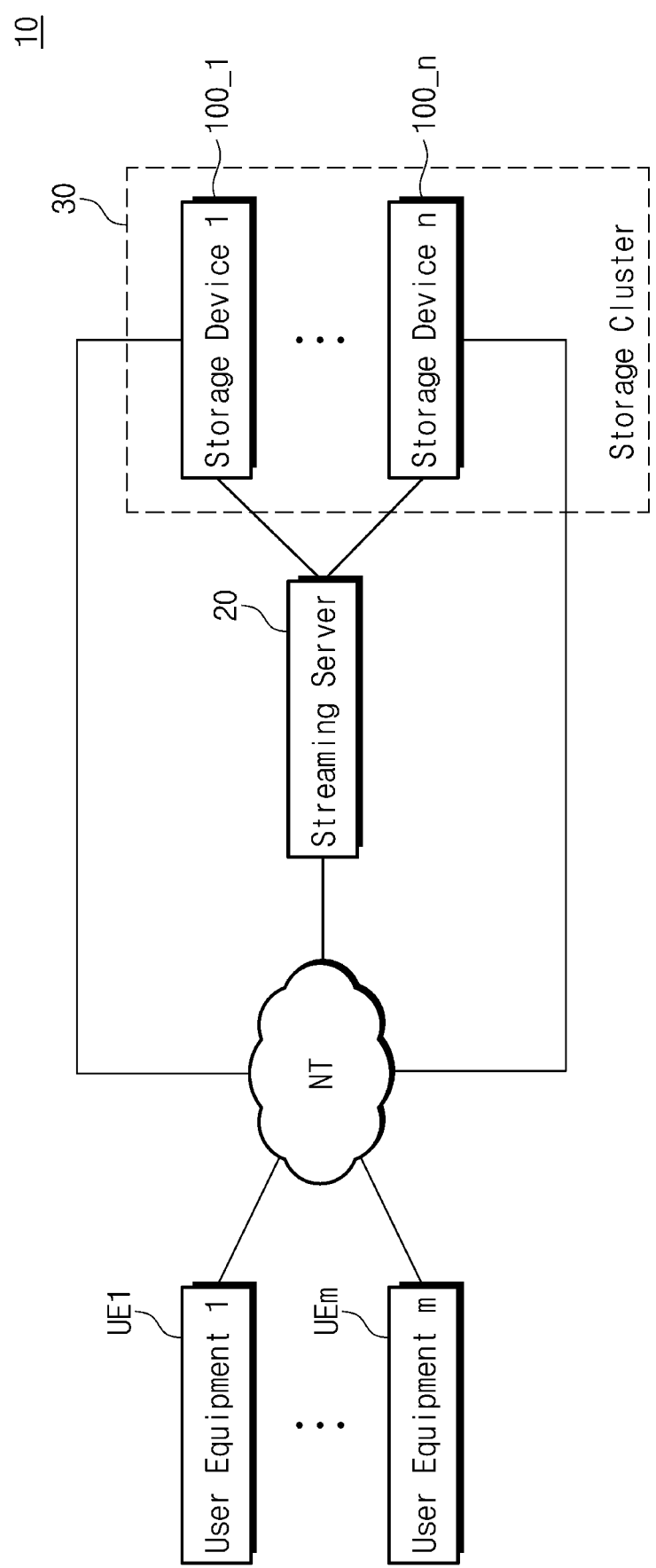
FIG. 1 is a block diagram illustrating a streaming system according to an embodiment of the present disclosure.

FIG. 1 is a block diagram illustrating a streaming system according to an embodiment of the present disclosure. Referring to FIG. 1, a streaming system 10 may include a plurality of user equipments (or client equipments) UE1 to UEm, a network NT, a streaming server 20, and a storage cluster 30. The storage cluster 30 may include a plurality of storage devices 100_1 to 100_n. In some embodiments, the streaming system 10 may be a system that is based on software-defined networking (SDN), dynamic adaptive streaming over and hypertext transfer protocol (HTTP) (DASH), or server and network-assisted DASH (SAND).

Each of the plurality of user equipments UE1 to UEm may include at least one of various information processing devices such as a personal computer, a laptop computer, a server, a workstation, a smartphone, and a tablet PC. In an embodiment, each of the plurality of user equipments UE1 to UEm may be a DASH client.

The plurality of user equipments UE1 to UEm may be connected with the network NT and may communicate with the streaming server 20 and the storage cluster 30 over the network NT. The plurality of user equipments UE1 to UEm may request a streaming service to the streaming server 20 and the storage cluster 30. For example, the plurality of user equipments UE1 to UEm may request video data over the network NT.

As will be understood by those skilled in the art, the network NT may be configured to support the short-range wireless communication between devices, as well as the communication using a mobile communication network, wired Internet, wireless Internet, a broadcasting network, etc. For example, the network NT may include at least one of networks, such as an Ad hoc network, intranet, extranet, a personal area network (PAN), a local area network (LAN), a wireless LAN, a campus area network (CAN), a metropolitan area network (MAN), a wide area network (WAN), a broadband network (BBN), a public switched telephone network (PSTN), and Internet. In some embodiments, the network NT may be implemented by using the Ethernet. The network NT may be a legacy network such as a TCP/IP network.

The streaming server 20 may be connected with the network NT and may communicate with each of the plurality of user equipments UE1 to UEm over the network NT. The streaming server 20 may provide the plurality of user equipments UE1 to UEm with command, codes, files, video data, content, and services over the network NT.

In an embodiment, the streaming server 20 may include a platform that provides the multimedia streaming service. The multimedia streaming service may refer to a service that transmits video data or content stored in the streaming server 20 or the storage cluster 30 to the plurality of user equipments UE1 to UEm, such that the data reception and playback are simultaneously made in the plurality of user equipments UE1 to UEm. In an embodiment, the streaming server 20 may be a server for broadcasting station or a server for over the top (OTT) service provider.

The streaming server 20 may be directly connected with the storage cluster 30. The streaming server 20 may be directly connected with each of the plurality of storage devices 100_1 to 100_n. The streaming server 20 may manage the plurality of storage devices 100_1 to 100_n as the storage cluster 30. In an embodiment, the streaming server 20 may be DASH-aware network elements (DANE). That is, the streaming server may include a minimum of information about the DASH-based protocol or formats.

The streaming server 20 may offload an application onto the storage cluster 30. For example, the streaming server 20 may offload an application onto the first storage device 100_1 based on the given standard (e.g., the NVMe interface standard). For example, the streaming server 20 may offload an application that perform a workload balancing operation, a scheduling operation for requests received from the plurality of user equipments UE1 to UEm, or an operation of selecting a video data transfer path to the plurality of user equipments UE1 to UEm.

The streaming server 20 may be configured to read data stored in the first storage device 100_1 or to store data in the first storage device 100_1. Alternatively, the streaming server 20 may transfer requests from the plurality of user equipments UE1 to UEm to the first storage device 100_1 such that the first storage device 100_1 executes the offloaded application (or an internal application).

The first storage device 100_1 may be a computational storage device with a computational function. The first storage device 100_1 may execute or drive the application offloaded from the streaming server 20. For example, the first storage device 100_1 may perform the workload balancing operation, the scheduling operation, the network transfer path selecting operation, etc. by driving the internal application.

In an embodiment, the first storage device 100_1 may perform the workload balancing operation. The first storage device 100_1 may balance (or distribute or reallocate) the requests from the plurality of user equipments UE1 to UEm within the storage cluster 30. For example, even though the first storage device 100_1 receives a first request of the first user equipment UE1 from the streaming server 20, the first storage device 100_1 may reallocate the first request to any other storage device (e.g., the second storage device 100_2) through the workload balancing operation. As such, the first storage device 100_1 may not process the first request, and the second storage device 100_2 may process the first request.

In some embodiments, the storage cluster 30 may evenly distribute the workload. Alternatively, the storage cluster 30 may balance the workload by first evaluating an available resource of each of the plurality of storage devices 100_1 to 100_n and determining a relative ability such that the QoE is overall improved.

The first storage device 100_1 may be directly connected with the streaming server 20, and the first storage device 100_1 may be connected with the plurality of user equipments UE1 to UEm over the network NT. In some embodiments, the first storage device 100_1 may be configured as DASH-aware network elements (DANE).

The first storage device 100_1 may upload, store, format, generate, and transfer video data based on the request from each of the plurality of user equipments UE1 to UEm. For example, the first storage device 100_1 may receive video data from at least one of the plurality of user equipments UE1 to UEm and may store the video data in a nonvolatile memory device 120 (refer to FIG. 2). The first storage device 100_1 may transfer video data read from the nonvolatile memory device 120 to at least one of the plurality of user equipments UE1 to UEm. The first storage device 100_1 may also format video data; for example, the first storage device 100_1 may perform a compression, encoding, and/or transcoding operation on video data.

The first storage device 100_1 may provide the plurality of user equipments UE1 to UEm with files, video data, content, streaming services, etc. over the network NT. In an embodiment, the first storage device 100_1 may send video data (or a multimedia file) to at least one of the plurality of user equipments UE1 to UEm in units of segment. For example, the multimedia file may be partitioned into one or more segments. The first storage device 100_1 may partition one multimedia file into a plurality of segments and may provide the plurality of segments to at least one of the plurality of user equipments UE1 to UEm.

In an embodiment, the first storage device 100_1 may generate, configure, or control a media presentation description (MPD) metadata file. For example, the MPD metadata file may provide information about a structure (or settings, characteristic, parameter) and a different version (or format, quality, or copy) of video data (or media content) stored in the first storage device 100_1 (or the storage cluster 30). The MPD metadata file may include information about at least one of a bitrate, a frame rate, a resolution, a codec type, or media representation configurations.

The first storage device 100_1 may communicate with each of the plurality of user equipments UE1 to UEm over the network NT. For example, when the connection (e.g., WebSocket connection) with the plurality of user equipments UE1 to UEm is established, the first storage device 100_1 may communicate with the plurality of user equipments UE1 to UEm over the network NT, but, advantageously, without intervention of the streaming server 20. The first storage device 100_1 may send video data to the plurality of user equipments UE1 to UEm. The remaining storage devices 100_2 to 100_n are identical or substantially similar to the first storage device 100_1, and thus, additional description will be omitted to avoid redundancy.

Figure 2:
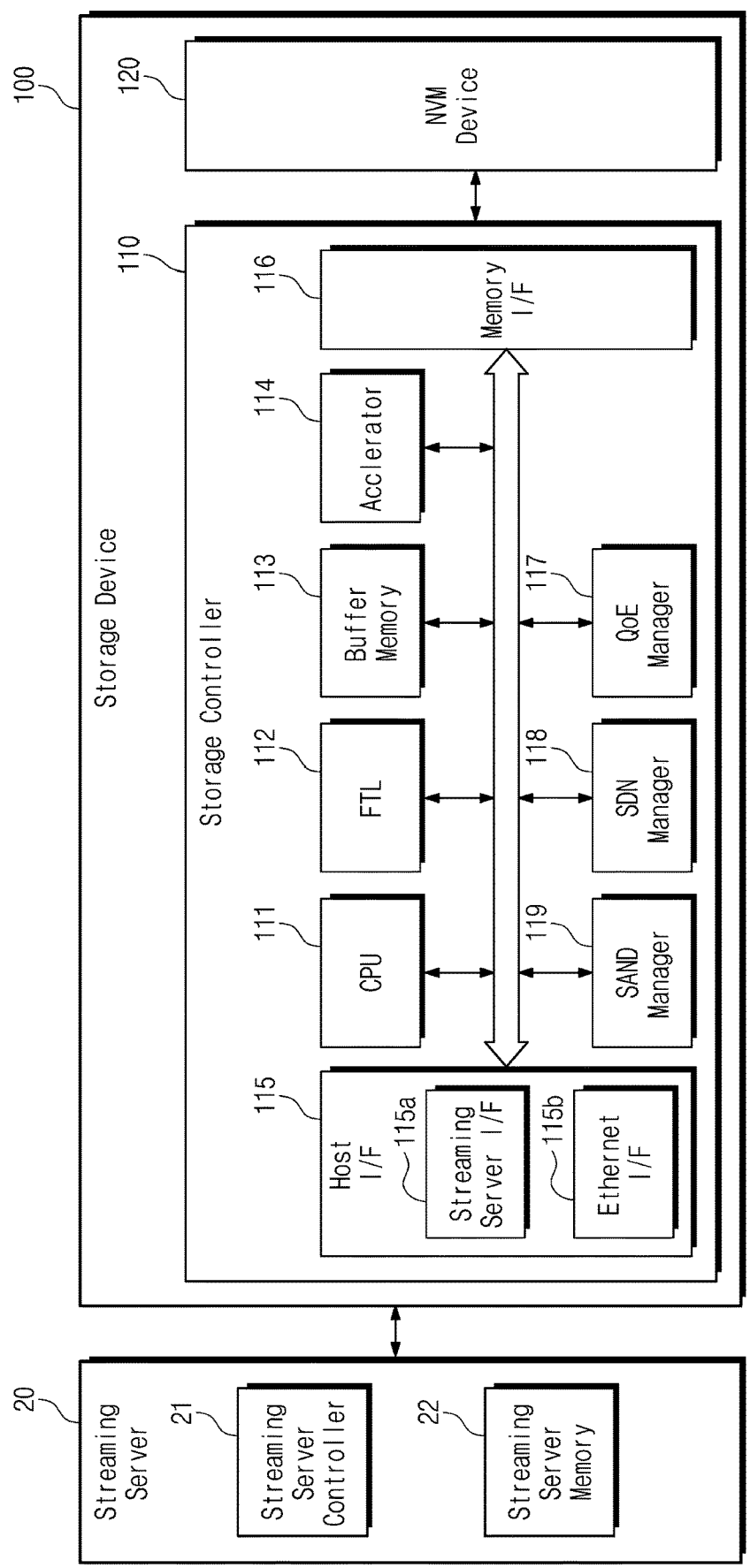
FIG. 2 is a block diagram illustrating a streaming server and a storage device of FIG. 1 in detail.

Below, for convenience of description, the description will be given based on the first storage device 100_1, but the present disclosure is not limited thereto. The remaining storage devices 100_2 to 100_n are identical to or similar to the first storage FIG. 2 is a block diagram illustrating a streaming server and a storage device of FIG. 1 in detail. Referring to FIGS. 1 and 2, a storage device 100 of FIG. 2 corresponds to the first storage devices 100_1 of the plurality of storage devices 100_1 to 100_n of FIG. 1. The remaining storage devices 100_2 to 100_n of FIG. 1 are identical or similar to the storage device 100.

The streaming server 20 may send, to the storage device 100, a request for storing data "DATA" in the storage device 100 or reading the data "DATA" stored in the storage device 100. In an embodiment, the streaming server 20 may be a processor core, which is configured to control the storage cluster 30, such as a central processing unit (CPU) or an application processor (AP), or may be a computing node connected over a network.

In an embodiment, the streaming server 20 may include a streaming server controller 21 and a streaming server memory 22. The streaming server controller 21 may be a device configured to control an overall operation of the streaming server 20 or to allow the streaming server 20 to control the storage device 100. The streaming server memory 22 may be a buffer memory, a cache memory, or a working memory that is used in the streaming server 20.

The storage device 100 may operate under control of the streaming server 20. The storage device 100 may include a storage controller 110 and the nonvolatile memory device 120. Under control of the streaming server 20, the storage controller 110 may store data in the nonvolatile memory device 120 or may read data stored in the nonvolatile memory device 120. In an embodiment, the storage controller 110 may perform various management operations for efficiently using the nonvolatile memory device 120.

The storage controller 110 may include a central processing unit (CPU) 111, a flash translation layer (FTL) 112, a buffer memory 113, an accelerator 114, a host interface circuit 115, a memory interface circuit 116, a quality of experience (QoE) manager 117, an SDN manager 118, and a SAND manager 119. The storage controller 110 may further include an error correction code (ECC) engine (not illustrated) and an advanced encryption standard (AES) engine (not illustrated).

The ECC engine may perform error detection and error correction on data read from the nonvolatile memory device 120. For example, the ECC engine may generate an error correction code (or a parity bit) for data to be written in the nonvolatile memory device 120. The generated error correction code (or parity bit) may be stored in the nonvolatile memory device 120 together with the data to be written. Afterwards, when the written data are read from the nonvolatile memory device 120, the ECC engine may detect and correct an error of the read data based on the read data and the corresponding error correction code (or the corresponding parity bit).

The AES engine may perform an encryption operation on data received from the streaming server 20 or may perform a decryption operation on data received from the nonvolatile memory device 120. In an embodiment, the encryption operation and the decryption operation may be performed based on a symmetric-key algorithm.

The CPU 111 may control an overall operation of the storage controller 110. For example, the CPU 111 may be configured to drive a variety of firmware or software running on the storage controller 110. The CPU 111 may be configured to perform various computations (or operations) to be processed on the storage controller 110 or to drive an application or computation program running on the storage controller 110.

In an embodiment, the CPU 111 may be configured to perform some of functions of an application that is driven on the streaming server 20. That is, advantageously, some applications of the streaming server 20 may be offloaded onto the storage device 100. In an embodiment, an internal application may be configured to perform various data processing operations such as a workload balancing operation, a scheduling operation, and a network transfer path selecting operation.

In an embodiment, the CPU 111, the accelerator 114, and the QoE manager 117 are illustrated as separate function blocks, but the present disclosure is not limited thereto. For example, each of the CPU 111, the accelerator 114, and the QoE manager 117 may be implemented with an independent processor core. Alternatively, the CPU 111, the accelerator 114, and the QoE manager 117 may be implemented with one processor core or may be implemented with a multi-core processor including a plurality of processor cores.

The FTL 112 may perform various operations for efficiently using the nonvolatile memory device 120. For example, the streaming server 20 may manage a storage space of the storage device 100 by using logical addresses. The FTL 112 may be configured to manage address mapping between a logical address from the streaming server 20 and a physical address of the storage device 100. The FTL 112 may perform a wear-leveling operation to prevent excessive degradation of a specific memory block of memory blocks of the nonvolatile memory device 120. A lifetime of the nonvolatile memory device 120 may be improved by the wear-leveling operation of the FTL 112. The FTL 112 may perform a garbage collection operation on the nonvolatile memory device 120 to secure a free memory block.

In an embodiment, the FTL 112 may be implemented in the form of hardware or software. In the case where the FTL 112 is implemented in the form of software, a program code or information associated with the FTL 112 may be stored in the buffer memory 113 and may be executed by the CPU 111. In the case where the FTL 112 is implemented in the form of hardware, a hardware accelerator configured to perform the operations of the FTL 112 may be separately provided.

The buffer memory 113 may be a write buffer or a read buffer configured to temporarily store data input to the storage controller 110. Alternatively, the buffer memory 113 may be configured to store a variety of information necessary for the storage controller 110 to operate. For example, the buffer memory 113 may store a mapping table that is managed by the FTL 112. Alternatively, the buffer memory 113 may store software, firmware, or information that is associated with the FTL 112.

In an embodiment, the buffer memory 113 may be configured to store data to be used by the CPU 111, the accelerator 114, and the QoE manager 117 or to store a program code for an application to be driven by the CPU 111, the accelerator 114, and the QoE manager 117. The CPU 111, the accelerator 114, and the QoE manager 117 may execute the program code stored in the buffer memory 113 or may perform various computations (or operations) on data stored in the buffer memory 113.

In an embodiment, the buffer memory 113 may be an SRAM, but the present disclosure is not limited thereto. For example, the buffer memory 113 may be implemented with various kinds of memory devices such as a DRAM, an MRAM, and a PRAM. For brevity of drawing and for convenience of description, an example in which the buffer memory 113 is included in the storage controller 110 is illustrated in FIG. 2, but the present disclosure is not limited thereto. The buffer memory 113 may be placed outside the storage controller 110, and the storage controller 110 may communicate with the buffer memory 113 over a separate communication channel or interface.

The accelerator 114 may be a dedicated circuit for high-speed data computation (or calculation). For example, the accelerator 114 may be a hardware circuit configured to automate a function such as encoding, transcoding, or compression.

In an embodiment, the accelerator 114 may perform the transcoding operation on video data. The transcoding operation may refer to an operation (or a work) that converts the following of video data or multimedia content: a file format, a resolution, and a quality of image. For example, the accelerator 114 may transcode a multimedia file from an original format to a scalable format. The storage controller 110 may store the file of the transcoded scalable format in the nonvolatile memory device 120. The plurality of user equipments UE1 to UEm may play back files with different resolutions. The storage device 100 may reduce the storage capacity by storing a file of a scalable format, not a plurality of files corresponding to different resolutions. The accelerator 114 may transcode a scalable format file stored in the nonvolatile memory device 120 to a multimedia file corresponding to a specific resolution or a specific format, based on a request provided from the plurality of user equipments UE1 to UEm to require the specific resolution or the specific format. The storage device 100 may provide the transcoded multimedia file to the user equipments UE1 to UEm.

In an embodiment, the accelerator 114 may encode and/or compress video data based on one of a plurality of codecs. For example, the accelerator 114 may encode and/or compress video data by using a codec and may generate the encoded (and/or compressed) video data. The codec is H.266 (or a code compatible with the FVC (Future Video Coding) standard), H.265 (or a code compatible with the HEVC (High-Efficiency Video Coding) standard), H.264 (or a code compatible with the AVC (Advanced Video Coding) standard), or any other suitable codes.

The host interface circuit 115 may include a streaming server interface circuit 115a and an Ethernet interface circuit 115b. The streaming server interface circuit 115a may be configured to communicate with the streaming server 20 in compliance with the given communication protocol. In an embodiment, the given interface protocol may include at least one of protocols for various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface or a network interface.

In an embodiment, the streaming server interface circuit 115a may be an NVMe interface circuit. The streaming server interface circuit 115a may receive a signal, which is based on the given interface protocol (e.g., the NVMe interface protocol), from the streaming server 20 and may operate based on the received signal. Alternatively, the streaming server interface circuit 115a may send a signal, which is based on the given interface protocol, to the streaming server 20.

The Ethernet interface circuit 115b may be configured to communicate with the user equipments UE1 to UEm over the network NT depending on the given interface protocol. In an embodiment, the given interface protocol may include an Ethernet interface. The Ethernet interface circuit 115b may receive a signal, which is based on the given interface protocol, from the network NT and may operate based on the received signal. Alternatively, the Ethernet interface circuit 115b may send a signal, which is based on the given interface protocol, to the network NT.

The memory interface circuit 116 may communicate with the nonvolatile memory device 120 in compliance with a given communication protocol. In an embodiment, the given interface protocol may include at least one of protocols for various interfaces such as a toggle interface and an open NAND flash interface (ONFI). In an embodiment, the memory interface circuit 116 may communicate with the nonvolatile memory device 120 based on the toggle interface. In this case, the memory interface circuit 116 may communicate with the nonvolatile memory device 120 over a plurality of channels CHs. In an embodiment, each of the plurality of channels CHs may include a plurality of signal lines configured to transfer various control signals (e.g., /CE, CLE, ALE, /WE, /RE, and R/B), data signals DQ, and a data strobe signal DQS.

The QoE manager 117 may perform various operations for overall improving the QoE. For example, the QoE manager 117 may determine a bitrate of video data (or a segment), which maximizes a sum of video qualities of the plurality of user equipments UE1 to UEm.

The QoE manager 117 may schedule requests received from the plurality of user equipments UE1 to UEm based on a variety of information (or various factors or scheduling parameters). Alternatively, the QoE manager 117 may schedule responses to be transferred to the plurality of user equipments UE1 to UEm, based on a variety of information. For example, the QoE manager 117 may perform the scheduling operation based on network information and storage device information.

In an embodiment, the QoE manager 117 may perform the scheduling operation based on at least one of scheduling parameters. For example, the QoE manager 117 may perform the scheduling operation only based on priority information. Alternatively, the QoE manager 117 may perform the scheduling operation based on both the priority information and information about a content kind (or a media file identifier).

In an embodiment, the QoE manager 117 may perform the scheduling operation based on scheduling parameters and weights corresponding to the scheduling parameters. The QoE manager 117 may assign a weight to each scheduling parameter for the purpose of overall improving the QoE. For example, the QoE manager 117 may assign the same weights or different weights to the scheduling parameters. The QoE manager 117 may perform the scheduling operation by performing an operation (i.e., a multiplication operation) on a scheduling parameter value and a weight. For example, the QoE manager 117 may assign a greater weight to a buffer state rather than the priority and may perform the scheduling operation.

The SDN manager 118 may control a network transfer path. In an embodiment, the SDN manager 118 may periodically collect network resource information. To satisfy the minimum bandwidth of all the user equipments UE1 to UEm, the SDN manager 118 may generate network connection information and may send the network connection information to the network NT. A configuration and an operating method of the SDN manager 118 will be described in detail with reference to FIG. 4.

The SAND manager 119 may be configured to process a SAND protocol. The SAND manager 119 may send and receive messages and may process the messages. For example, the SAND manager 119 may send a PED message to the streaming server 20 or any other storage device (e.g., the second storage device 100_2). The SAND manager 119 may send PER messages to the plurality of user equipments UE1 to UEm. The SAND manager 119 may receive metrics and status messages from the plurality of user equipments UE1 to UEm. The PED message, the PER message, and the metrics and status message will be described in detail with reference to FIG. 3.

As described above, the storage device 100 may drive the application offloaded from the streaming server 20, may perform the scheduling operation on requests based on the network information and the storage device information, and may set the network transfer path. As such, the streaming system 10 with improved QoE and performance is provided.

Figure 3:
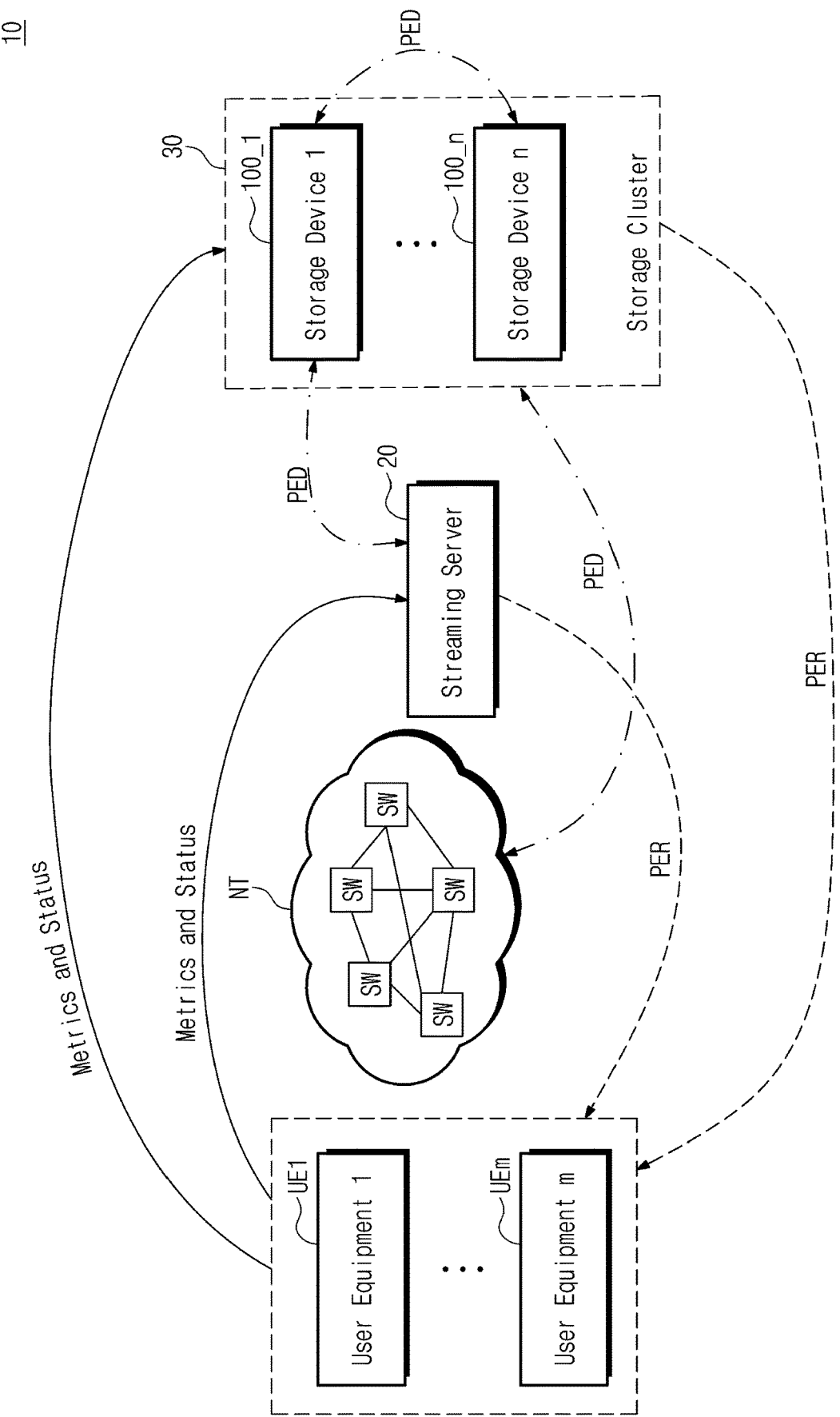
FIG. 3 is a diagram for describing an operation of a streaming system of FIG. 1.

FIG. 3 is a diagram for describing an operation of a streaming system of FIG. 1. Referring to FIGS. 1 and 3, the streaming system 10 that is based on the DASH may use the SAND technology. The streaming system 10 may send and receive messages by using the SAND technology. The SAND technology may provide messages between the DASH client and the DANE. Alternatively, the SAND technology may provide messages between the DANE. The message may include information about performance, capability, status, network, server, proxy, cache of each of the plurality of user equipments UE1 to UEm and information about performance, capability, status, and real-time operation characteristic of each of the plurality of storage devices 100_1 to 100_n. The streaming system 10 may exchange messages to improve the QoE.

In an embodiment, the message may be used to provide information about real-time operation characteristics of a network, a server, a proxy, a cache, and content distribution content delivery networks (CDNs). The streaming system 10 may improve the performance of the plurality of user equipments UE1 to UEm and a streaming section of streaming content through the SAND technology.

For example, each of the plurality of user equipments UE1 to UEm and the streaming server 20 may exchange messages. Each of the plurality of user equipments UE1 to UEm and each of the plurality of storage devices 100_1 to 100_n may exchange messages. The streaming server 20 and each of the plurality of storage devices 100_1 to 100_n may exchange messages. The plurality of storage devices 100_1 to 100_n may exchange messages.

In an embodiment, the streaming server 20 and the storage cluster 30 may exchange parameters enhancing delivery (PED) messages. For example, the streaming server 20 and the first storage device 100_1 may exchange the PED messages. The first storage device 100_1 and the second storage device 100_2 may exchange the PED messages. For example, the PED message may include a service quality parameter for the transcoding operation, a bandwidth parameter, a transcoding/converting parameter, a parameter associated with workload balancing, a parameter associated with request allocation, etc.

The network NT may include a plurality of network elements or a plurality of network devices. That is, the network NT may include a plurality of switches SW. The switch SW may be the DASH-aware network elements (DANE). The switch SW and the storage cluster 30 may exchange the PED messages. For example, the switch SW and the first storage device 100_1 may send and receive the PED messages.

In an embodiment, the streaming server 20 and the storage cluster 30 may send parameters enhancing delivery (PER) messages to the plurality of user equipments UE1 to UEm. For example, the streaming server 20 may send the PER message to the first user device UE1. The first storage device 100_1 may send the PER message to the first user equipment UE1. For example, the PER message may include information about a cache segment, alternative segment availability, timing information about transfer, a network throughput/QoS, a transcoding parameter, and storage device capability.

In an embodiment, the plurality of user equipments UE1 to UEm may send the metrics and status message to the streaming server 20 and the storage cluster 30. For example, the first user equipment UE1 may send the metrics and status message to the streaming server 20. The first user equipment UE1 may send the metrics and status message to the first storage device 100_1. The metrics and status message may include information about average throughput, buffer level, initial playback latency (or delay), HTTP request/response transaction, representation conversion event, playlist, latency, client capability, bandwidth, quality, expected segment, or acceptable alternative content.

As described above, the streaming system 10 may satisfy QoE-related requirements and capacities of the plurality of user equipments UE1 to UEm by using the PED message, the PER message, and the metrics and status message.

Figure 4:
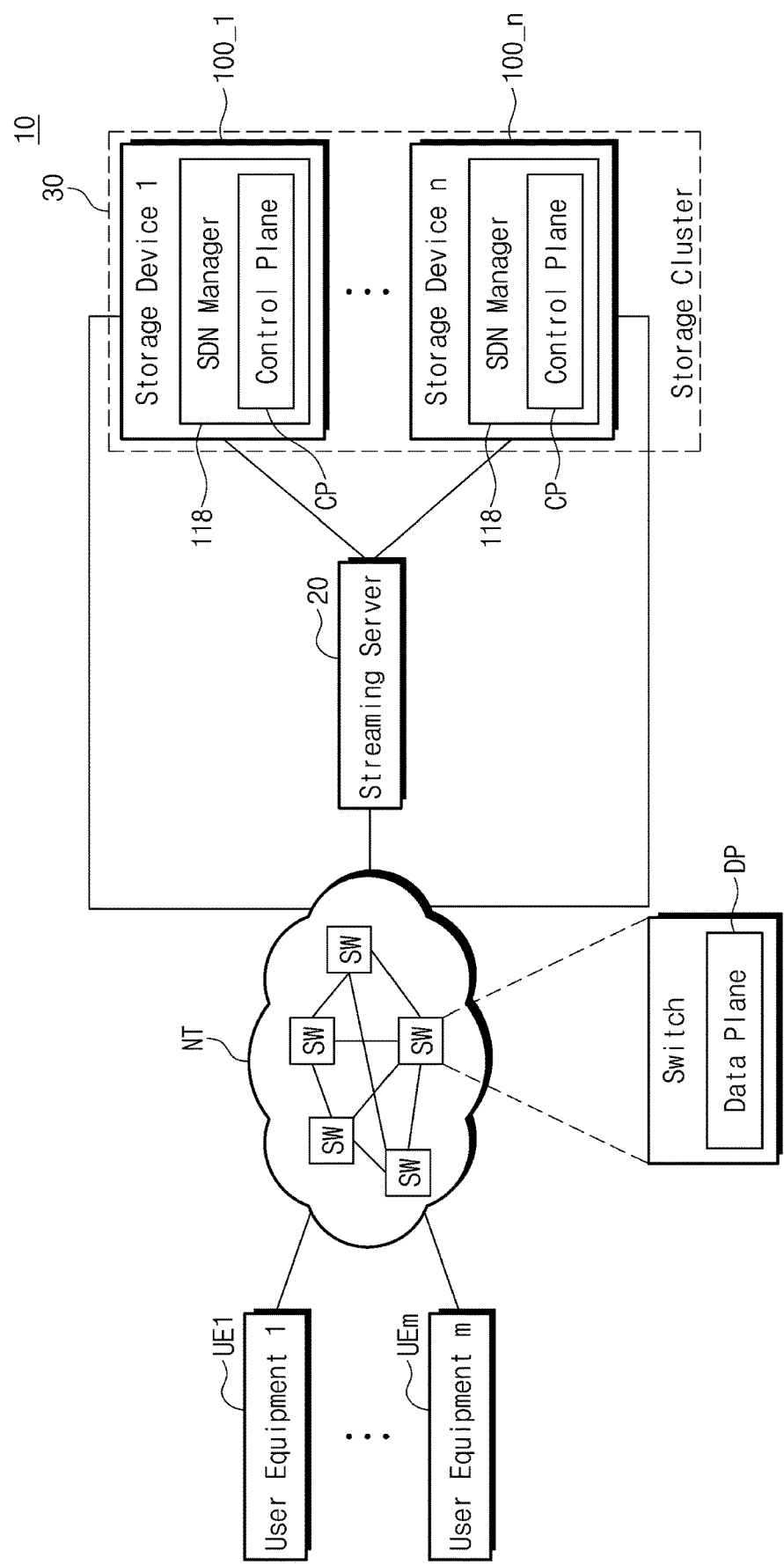
FIG. 4 is a block diagram illustrating a streaming system of FIG. 1 in detail.

FIG. 4 is a block diagram illustrating a streaming system of FIG. 1 in detail. Referring to FIGS. 1 and 4, a network control in a software defined network environment may be programmable, and a control function and a transfer function of the network may be physically separated from each other. Each of the plurality of storage devices 100_1 to 100_n may send video data to the plurality of user equipments UE1 to UEm in units of packet or traffic over the network. Each of the plurality of storage devices 100_1 to 100_n may include the SDN manager 118. The SDN manager 118 may include a control plane CP.

In an embodiment, the network NT may include a plurality of network elements (e.g., switches or routers). Each of the plurality of network elements may forward, switch, or route a packet. For example, the network NT may include the plurality of switches SW. The switch SW may include a data plane DP.

Each network element (i.e., the switch SW) may connect each of the plurality of user equipments UE1 to UEm with the inside of the network NT or may connect each of the plurality of user equipments UE1 to UEm with the streaming server 20 placed outside the network NT or the storage cluster 30 placed outside the network NT.

The data plane DP may receive the network connection information from the control plane CP. The data plane DP may establish the connection between the plurality of user equipments UE1 to UEm and the plurality of storage devices 100_1 to 100_n based on the network connection information. The data plane DP may forward, switch or route (or bridge) a packet based on the network connection information. For example, the data plane DP may store or read video data requested from the plurality of user equipments UE1 to UEm in the plurality of storage devices 100_1 to 100_n based on the network connection information. The data plane DP may forward a control packet associated with a connection control or an orchestration based on the network connection information.

In an embodiment, the data plane DP may manage a packet transfer. The data plane DP may receive a packet through an input port. The data plane DP may determine an output port corresponding to a packet. The data plane DP may forward the packet through the output port. For example, the data plane DP may include a network flow table. The network flow table may include mapping information of a packet path and an output port. The data plane DP may forward a packet to an output port corresponding to a packet path based on the network connection information received from the control plane CP. The data plane DP may perform a function such as a packet modification function or a quality of service (QoS) function, or a filtering function.

In an embodiment, the SDN manager 118 may perform a path optimization and routing function. The SDN manager 118 may be configured to control the plurality of switches SW (or routers) for the purpose of controlling the flow of video data (or a packet or a traffic on a network).

The control plane CP of the SDN manager 118 may orchestrate, manage, or control the data plane DP. The control plane CP may generate or set the network connection information. The control plane CP may send the network connection information to the data plane DP. The data plane DP may selectively forward, switch, or route a packet based on the network connection information.

The SDN manager 118 may manage the flow of video data to determine a path from each of the plurality of storage devices 100_1 to 100_n to each of the plurality of user equipments UE1 to UEm. For example, the first storage device 100_1 may manage the flow of packets to set a transfer path from the first storage device 100_1 to the first user equipment UE1.

In an embodiment, the SDN manager 118 may configure the topology of the entire network based on information provided from the outside. The SDN manager 118 may calculate a path, through which video data are transferred, based on the topology information and the information received from the plurality of user equipments UE1 to UEm. The SDN manager 118 may perform set, manage, and release a path of the flow of packets based on the network connection information such that a packet to be transferred over the network NT are output to a correct physical port of the plurality of switches SW.

The SDN manager 118 may generate the network connection information. For example, the network connection information may include a flow rule, information about a transfer path (or routing path), information about network bandwidth management, restoration, security, and policy setting, overall control information about network topology, and orchestration information. The SDN manager 118 may send the network connection information to the plurality of switches SW on the transfer path to control the installation of the flow rule in the plurality of switches SW. The protocol that the SDN manager 118 uses to manage the installation of the flow rule in the switch SW or the deletion of the flow rule from the switch SW may be referred to as an "open flow protocol". For example, the SDN manager 118 may establish the connection between the first storage device 100_1 and the first user equipment UE1 based on the network connection information.

The SDN manager 118 may adjust a transfer path of video data. The SDN manager 118 may select an optimal transfer path from a plurality of paths. Alternatively, the SDN manager 118 may control network elements to again adjust (or set) the transfer path of video data.

The SDN manager 118 may set a transfer path of each request such that there is satisfied the minimum bandwidth that the plurality of user equipments UE1 to UEm require. The SDN manager 118 may set a transfer path of each request for the purpose of overall improving the QoE while satisfying the minimum bandwidth. The SDN manager 118 may consider a plurality of transfer paths for a first request RQ1 received from the first user equipment UE1. The SDN manager 118 may select first and second transfer paths satisfying the minimum bandwidth from among the plurality of transfer paths. The SDN manager 118 may select the first transfer path with the shortest latency as the final path. Alternatively, to satisfy the minimum bandwidth of the remaining user equipments UE2 to UEm or to overall improve the QoE, the SDN manager 118 may select the second transfer path whose latency is longer than that of the first transfer path, as the final path.

In an embodiment, the SDN manager 118 may further include machine learning logic. The machine learning logic may include a hardware component, a software component, or a hybrid component thereof. For example, the machine learning logic may include a dedicated hardware circuit configured to perform a specific operation. Alternatively, the machine learning logic may include one or more processor cores that execute an instruction set of a program code configured to perform the specific operation.

The machine learning logic may calculate or compute a transfer path of a packet based on the topology information and the information received from the plurality of user equipments UE1 to UEm. The machine learning logic may determine an optimal transfer path among the plurality of transfer paths. The machine learning logic may calculate transfer paths respectively corresponding to a plurality of requests from the plurality of user equipments UE1 to UEm, based on the plurality of requests. The machine learning logic may calculate optimal transfer paths satisfying the minimum bandwidth or latency that the plurality of user equipments UE1 to UEm require. The machine learning logic may generate the network connection information corresponding to the transfer path and may send the network connection information to the data plane DP.

Figure 5:
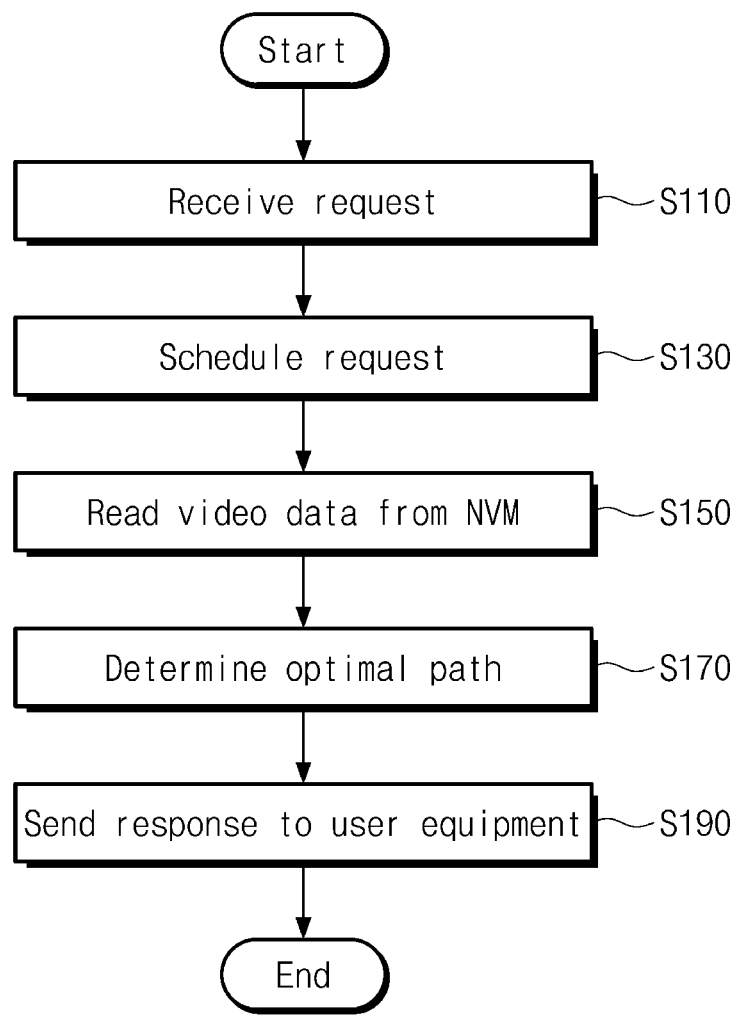
FIG. 5 is a flowchart illustrating an example of an operation of a storage device of FIG. 2.

FIG. 5 is a flowchart illustrating an example of an operation of a storage device of FIG. 2. Referring to FIGS. 2 and 5, in operation S110, the storage device 100 may receive a write request. For example, the storage device 100 may receive a first request for first video data from the first user equipment UE1 and may receive a second request for second video data from the second user equipment UE2.

In operation S130, the storage device 100 may schedule (or order) requests. For example, the QoE manager 117 may schedule requests received from the plurality of user equipments UE1 to UEm. The QoE manager 117 may manage a first queue and a second queue. The first queue and the second queue may be stored in the buffer memory 113. The first queue may store requests of the first user equipment UE1. The second queue may store requests of the second user equipment UE2.

The QoE manager 117 may schedule requests based on various schemes. In an embodiment, based on the round robin (RR) scheme, the QoE manager 117 may select one of requests included in a plurality of queues (e.g., the first queue and the second queue) and may process the selected request.

In an embodiment, based on the weighted round robin (WRR) scheme, the QoE manager 117 may select one of requests included in the plurality of queues and may process the selected request. Each of the plurality of queues may have a weight. The weight may include an urgent weight, a high weight, a medium weight, and a low weight. For example, the first queue may be set to have the medium weight, and the second queue may be set to have the low weight. The weights of the plurality of queues may be determined in advance. Alternatively, the weights of the plurality of queues may be determined or managed by the QoE manager 117 (e.g., values of the weights may be changed by the QoE manager 117 during an operation).

In an embodiment, based on the priority scheme, the QoE manager 117 may select one of requests included in the plurality of queues and may process the selected request. For example, the QoE manager 117 may first process requests included in the first queue prior to requests included in the second queue. For example, the QoE manager 117 may schedule the first and second requests such that the first request is processed prior to the second request.

In an embodiment, the QoE manager 117 may schedule requests (or responses) based on network information and storage device information. For example, the network information may refer to information about network status (or situation). The network information may include information about bandwidth, latency, and whether it is crowded (or jammed). The storage device information may include information about status (or situation) of the storage device 100. The storage device information may include buffer information, latency information, etc.

In operation S150, the storage device 100 may read video data from the nonvolatile memory device 120. The storage device 100 may load the video data from the nonvolatile memory device 120 onto the buffer memory 113 based on a scheduling result. The storage device 100 may load first video data from the nonvolatile memory device 120 onto the buffer memory 113 and may then load second video data onto the buffer memory 113.

In operation S170, the storage device 100 may determine an optimal path of video data. For example, the SDN manager 118 may set an optimal path for the first video data up to the first user equipment UE1. The SDN manager 118 may set the path of the first video data from the first storage device 100_1 to the first user equipment UE1 based on the metrics and status message and the network status. The SDN manager 118 may generate the network connection information for controlling the data plane DP of each switch SW. The SDN manager 118 may set an optimal path for the second video data up to the second user equipment UE2.

In operation S190, the storage device 100 may send a response including the video data to the user equipment. For example, the storage device 100 may send a response corresponding to the first request to the first user equipment UE1. That is, the storage device 100 may send the response including the first video data to the first user equipment UE1 over the network NT. The storage device 100 may send first network connection information including information about the optimal transfer path of the first video data to network elements (e.g., the switch SW). The storage device 100 may send a response corresponding to the second request to the second user equipment UE2.

Figure 6:
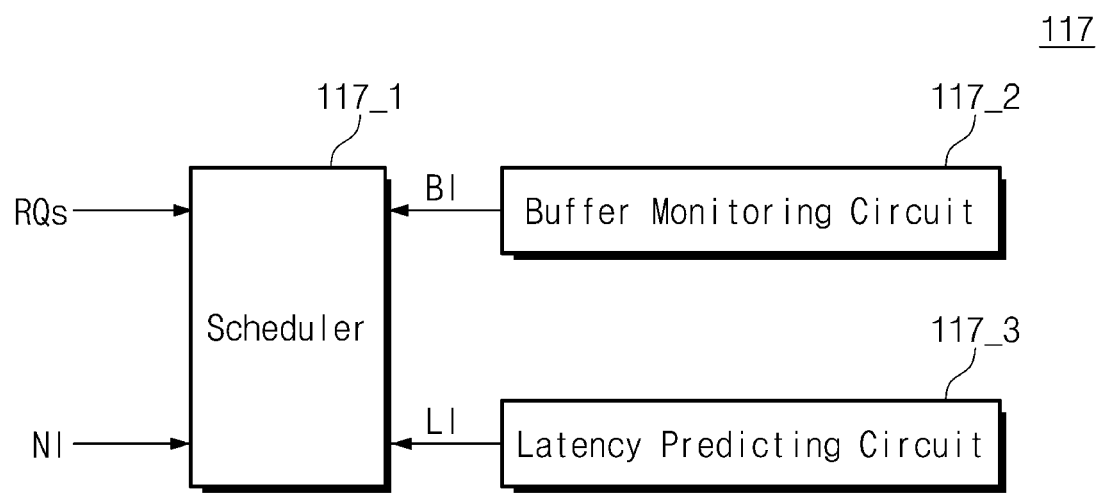
FIG. 6 is a diagram for describing operation S150 of FIG. 5.

FIG. 6 is a diagram for describing operation S150 of FIG. 5. Referring to FIGS. 1, 2, 5, and 6, the QoE manager 117 may include a scheduler 117_1, a buffer monitoring circuit 117_2, and a latency predicting circuit 117_3. The scheduler 117_1 may receive a request RQ and network information NI. For example, the scheduler 117_1 may receive the request RQ (or a message) requiring video data from the plurality of user equipments UE1 to UEm through the host interface circuit 115. The scheduler 117_1 may receive the network information NI from the SDN manager 118 or the SAND manager 119. The scheduler 117_1 may receive buffer information BI from the buffer monitoring circuit 117_2. The scheduler 117_1 may receive latency information LI from the latency predicting circuit 117_3.

To improve the QoE, the scheduler 117_1 may schedule, or order, a plurality of requests based on a variety of information (or scheduling parameters). For example, the scheduler 117_1 may perform the scheduling operation on the plurality of requests based on the request RQ, the network information NI, and the storage device information. That is, the scheduling parameter may include at least one of the request RQ, the network information NI, and the storage device information.

The scheduler 117_1 may assign different weights to scheduling parameters. The scheduler 117_1 may perform the scheduling operation on requests based on a scheduling parameter and a weight corresponding to the scheduling parameter.

The buffer monitoring circuit 117_2 may monitor a buffer area corresponding to each of the plurality of user equipments UE1 to UEm. Alternatively, the buffer monitoring circuit 117_2 may monitor a buffer area corresponding to received requests. The buffer monitoring circuit 117_2 may calculate how much data are loaded from the nonvolatile memory device 120. The buffer monitoring circuit 117_2 may generate the buffer information BI and may send the buffer information BI to the scheduler 117_1. The buffer information BI may include information about a buffer occupation ratio, a buffer charging speed, etc.

The latency predicting circuit 117_3 may predict a latency (or a delay time) in the storage device 100. The latency predicting circuit 117_3 may predict the latency and may generate the latency information LI. The latency predicting circuit 117_3 may send the latency information LI to the scheduler 117_1. The latency information LI may include a nonvolatile memory access time, an accelerator time required, etc. The nonvolatile memory access time may indicate a time (or a necessary time) taken to load video data corresponding to a request from the nonvolatile memory device 120 to the buffer memory 113. The nonvolatile memory access time may indicate an elapsed time from a time when a read command is sent to the nonvolatile memory device 120 to a time when video data corresponding to the read command are completely written in the buffer memory 113.

The latency predicting circuit 117_3 may predict or calculate a nonvolatile memory access time "T" based on Equation 1 below. $T_{cmd}$ may represent a command transfer time from the storage controller 110 to the nonvolatile memory device 120, and $T_{addr}$ may represent an address transfer time from the storage controller 110 to the nonvolatile memory device 120, tR may represent a data transfer time from a memory cell array of the nonvolatile memory device 120 to a register, tRC may represent a read cycle time, $L_{ecc}$ may represent an ECC delay time, and pageSize may represent a page size.

$$T = T_{cmd} + T_{addr} + tR + tRC \times pageSize + L_{ecc} + Tclk \times pageSize \quad \text{[Equation 1]}$$

In an embodiment, the accelerator time required may indicate a time (or a necessary time) taken to perform the compression, encoding, or transcoding operation at the accelerator 114. That is, the accelerator time required may indicate an elapsed time from a time when a command is sent such that the accelerator 114 performs the compression, encoding, or transcoding operation to a time when video data (e.g., compressed video data, encoded video data, or transcoded video data) corresponding to the command are received.

As described above, the QoE manager 117 of the present disclosure may schedule requests based on the storage device information, as well as the network information NI. Accordingly, the QoE manager 117 may provide improved performance, with the minimum bandwidth of the plurality of user equipments UE1 to UEm satisfied and may overall improve the QoE.

Figure 7B:
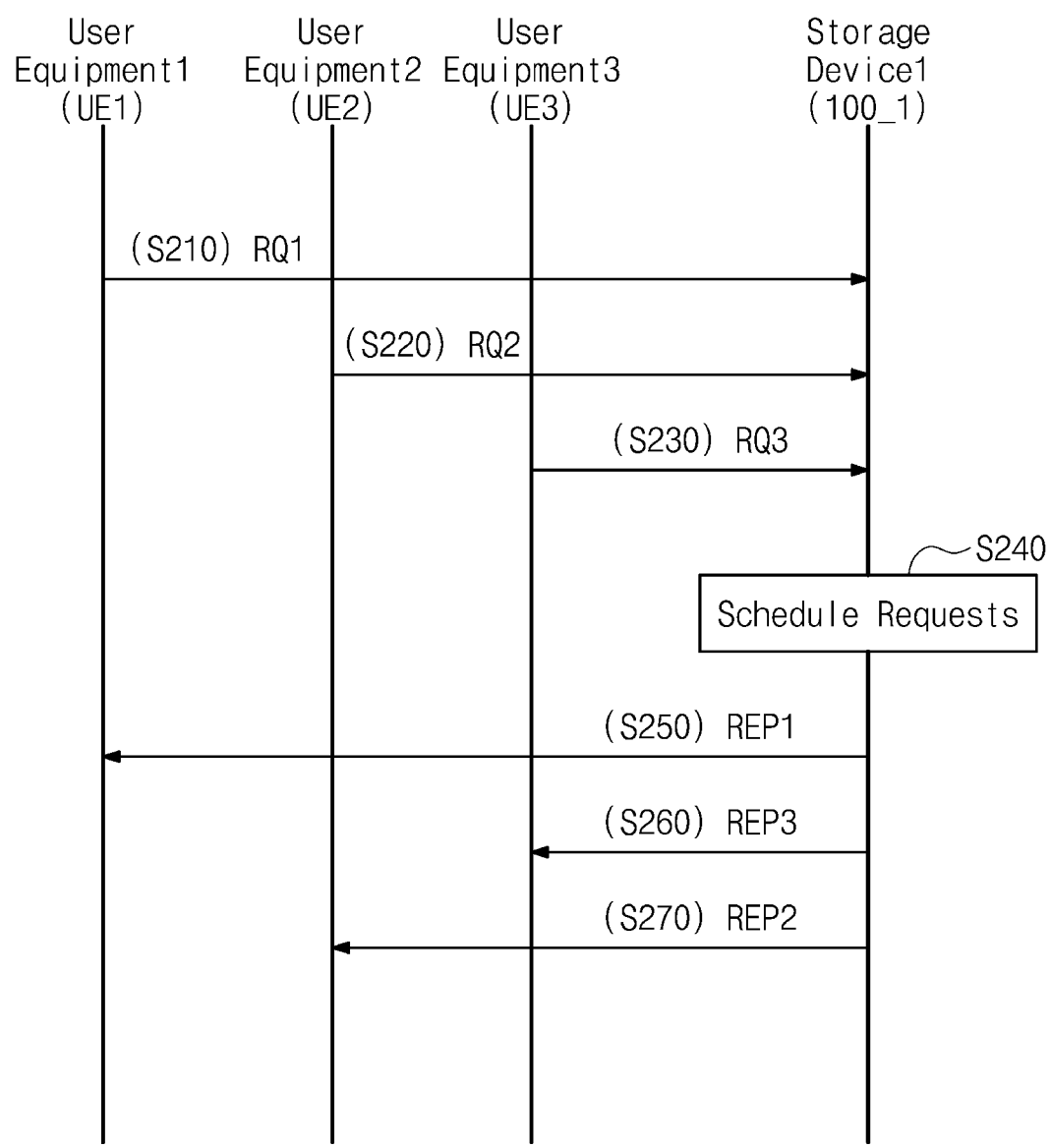

FIGS. 7A and 7B are diagrams for describing an operation of a QoE manager of FIG. 2. Referring to FIGS. 2, 7A, and 7B, the first storage device 100_1 may receive requests from the plurality of user equipments UE1 to UEm. For example, the first storage device 100_1 may receive a first request RQ1 from the first user equipment UE1, may receive a second request RQ2 from the second user equipment UE2, and may receive a third request RQ3 from the third user equipment UE3.

The plurality of user equipments UE1 to UEm may have different priorities. For example, the first user equipment UE1 may have the priority of a first level LV1, the second user equipment UE2 may have the priority of a second level LV2, and the third user equipment UE3 may have the priority of a third level LV3. That is, the priority of the second user equipment UE2 may be higher than the priority of the third user equipment UE3, and the priority of the first user equipment UE1 may be higher than the priority of the second user equipment UE2.

The request RQ may include information about a content kind (or a media file identifier), a segment identifier, a quality, a codec type, etc. For example, the first request RQ1 may include a first identifier ID1 indicating a first file, a first quality Q1 (e.g., 1080p), and a first codec type C1 (e.g., H.265). The second request RQ2 may include a second identifier ID2 indicating a second file, a second quality Q2 (e.g., 480p), and a second codec type C2 (e.g., H.264). The third request RQ3 may include the first identifier ID1 indicating the first file, a third quality Q3 (e.g., 4k), and a third codec type C3 (e.g., H.266).

In operation S210, the first user equipment UE1 may send the first request RQ1 to the first storage device 100_1 over the network NT. In operation S220, the second user equipment UE2 may send the second request RQ2 to the first storage device 100_1 over the network NT. In operation S230, the third user equipment UE3 may send the third request RQ3 to the first storage device 100_1 over the network NT.

In operation S240, the first storage device 100_1 may perform the scheduling operation on requests. For example, the QoE manager 117 may receive the first to third requests RQ1 to RQ3. In an embodiment, the QoE manager 117 may perform the scheduling operation only based on priorities. For example, because the first request RQ1 has the first level LV1, the second request RQ2 has the second level LV2, and the third request RQ3 has the third level LV3, the QoE manager 117 may perform the scheduling operation such that the second request RQ2 is processed prior to the third request RQ3 and the first request RQ1 is processed prior to the second request RQ2. That is, the QoE manager 117 may schedule the first request RQ1, the second request RQ2, and the third request RQ3 in order from highest to lowest.

In an embodiment, the QoE manager 117 may schedule the first to third requests RQ1 to RQ3 based on the priority and the media file identifier. Because the media file identifier of the first request RQ1 is the first identifier ID1 and the media file identifier of the third request RQ3 is the first identifier ID1, the QoE manager 117 may perform scheduling in order of the first request RQ1, the third request RQ3, and the second request RQ2. That is, because both the first request RQ1 and the third request RQ3 require the same content (e.g., the first file), to overall improve the QoE, scheduling may be made such that the third request RQ3 is processed prior to the second request RQ2.

The first storage device 100_1 may process the requests based on a scheduling result. In operation S250, the first storage device 100_1 may send a first response REP1 corresponding to the first request RQ1 to the first user equipment UE1. In operation S260, the first storage device 100_1 may send a third response REP3 corresponding to the third request RQ3 to the third user equipment UE3. In operation S270, the first storage device 100_1 may send a second response REP2 corresponding to the second request RQ2 to the second user equipment UE2.

Figure 8A:
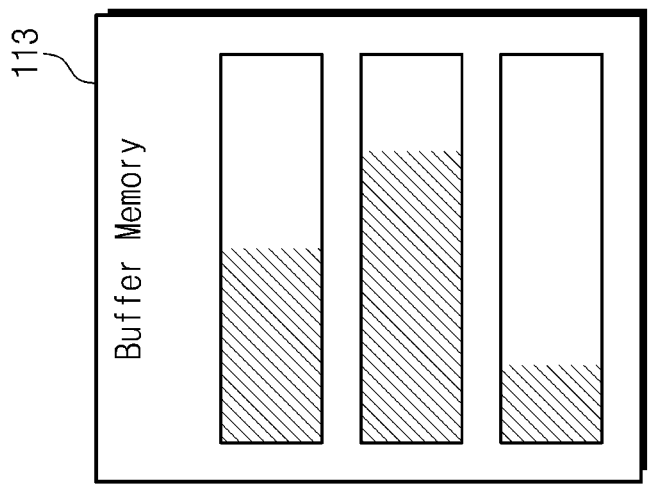
FIGS. 8A and 8B are diagrams for describing an operation of a QoE manager of FIG. 2.
Figure 8B:
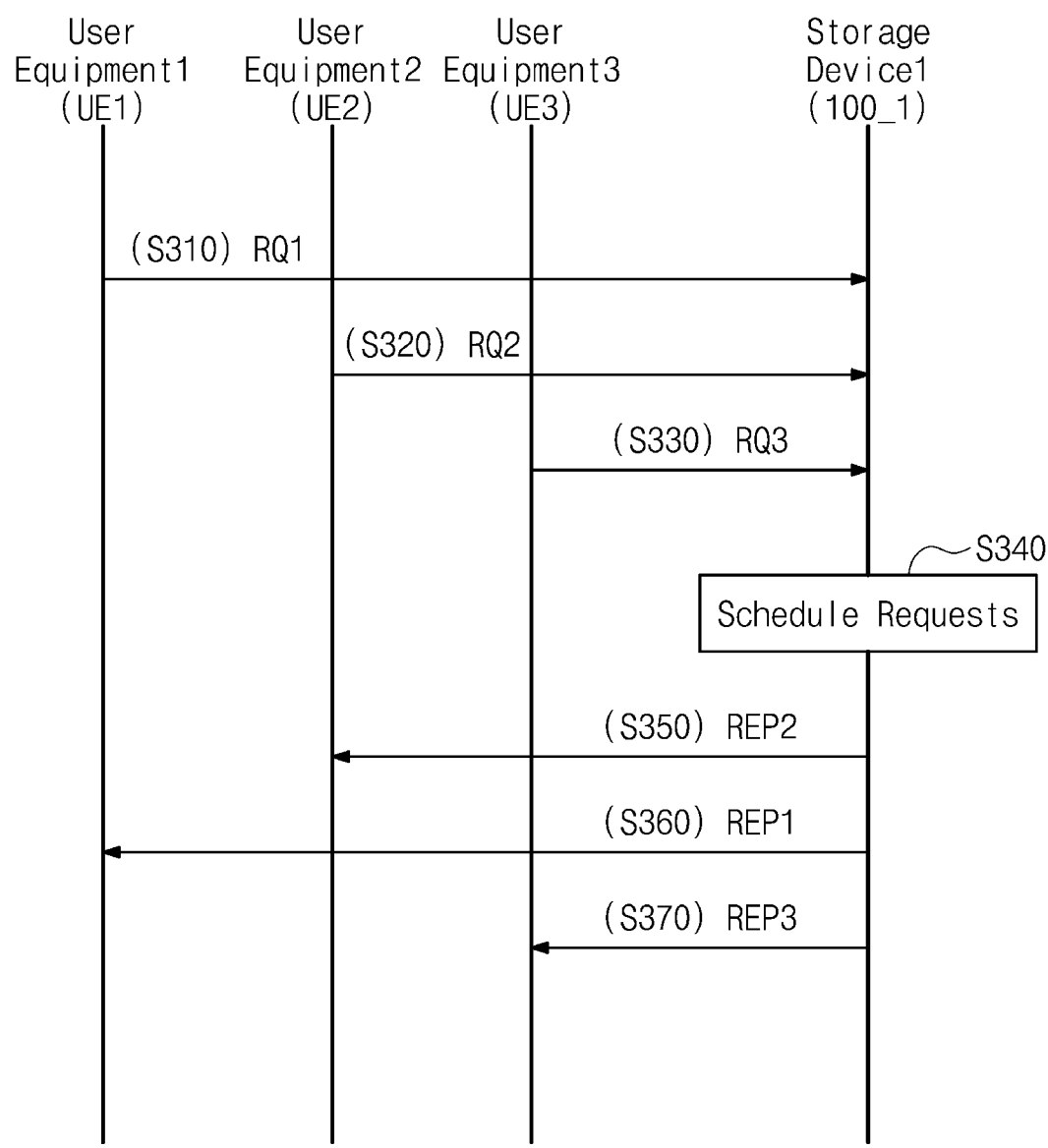

FIGS. 8A and 8B are diagrams for describing an operation of a QoE manager of FIG. 2. Referring to FIGS. 2, 8A, and 8B, the first storage device 100_1 may receive requests from the plurality of user equipments UE1 to UEm. For example, the first storage device 100_1 may receive the first request RQ1 from the first user equipment UE1, may receive the second request RQ2 from the second user equipment UE2, and may receive the third request RQ3 from the third user equipment UE3.

The plurality of user equipments UE1 to UEm may have different priorities. For example, the first user equipment UE1 may have the priority of the first level LV1, the second user equipment UE2 may have the priority of the second level LV2, and the third user equipment UE3 may have the priority of the third level LV3. That is, the priority of the second user equipment UE2 may be higher than the priority of the third user equipment UE3, and the priority of the first user equipment UE1 may be higher than the priority of the second user equipment UE2.

The request RQ may include information about a content kind (or a media file identifier), a segment identifier, a quality, a codec type, etc. For example, the first request RQ1 may include the first identifier ID1 indicating a first file, the first quality Q1 (e.g., 1080p), and the first codec type C1 (e.g., H.265). The second request RQ2 may include the second identifier ID2 indicating a second file, the second quality Q2 (e.g., 480p), and the second codec type C2 (e.g., H.264). The third request RQ3 may include a third identifier ID3 indicating a third file, the third quality Q3 (e.g., 4k), and the third codec type C3 (e.g., H.266).

In operation S310, the first user equipment UE1 may send the first request RQ1 to the first storage device 100_1 over the network NT. In operation S320, the second user equipment UE2 may send the second request RQ2 to the first storage device 100_1 over the network NT. In operation S330, the third user equipment UE3 may send the third request RQ3 to the first storage device 100_1 over the network NT. In operation S340, the first storage device 100_1 may perform the scheduling operation on requests.

In an embodiment, the QoE manager 117 may schedule the first to third requests RQ1 to RQ3 based on the buffer information BI. The storage controller 110 may load video data (e.g., the first file) indicated by the first identifier ID1 onto the buffer memory 113 from the nonvolatile memory device 120. That is, the storage controller 110 may read the first file from the nonvolatile memory device 120 and may write the first file in the buffer memory 113. For example, the storage controller 110 may send a first read command corresponding to the first request RQ1 to the nonvolatile memory device 120. The storage controller 110 may load video data (e.g., the second file) indicated by the second identifier ID2 onto the buffer memory 113 from the nonvolatile memory device 120. The storage controller 110 may send a second read command corresponding to the second request RQ2 to the nonvolatile memory device 120. The storage controller 110 may load video data (e.g., the third file) indicated by the third identifier ID3 onto the buffer memory 113 from the nonvolatile memory device 120. The storage controller 110 may send a third read command corresponding to the third request RQ3 to the nonvolatile memory device 120. The storage controller 110 may simultaneously process the first to third requests RQ1 to RQ3. That is, the storage controller 110 may simultaneously send the first to third read commands to the nonvolatile memory device 120.

The buffer monitoring circuit 117_2 may monitor the amount of data loaded onto the buffer memory 113 from the nonvolatile memory device 120. Whenever video data are loaded onto the buffer memory 113 from the nonvolatile memory device 120, the buffer monitoring circuit 117_2 may increase the buffer occupation ratio by a given unit (e.g., a page size) and may calculate or compute the buffer occupation ratio and the buffer charging speed.

For example, the buffer monitoring circuit 117_2 may manage buffer areas respectively corresponding to the plurality of user equipments UE1 to UEm. For example, the buffer monitoring circuit 117_2 may manage a first buffer area BA1 corresponding to the first user equipment UE1, may manage a second buffer area BA2 corresponding to the second user equipment UE2, and may manage a third buffer area BA3 corresponding to the third user equipment UE3. The buffer monitoring circuit 117_2 may monitor the plurality of buffer areas BA1 to BA3.

The storage controller 110 may load the first file onto the first buffer area BA1, may load the second file onto the second buffer area BA2, and may load the third file onto the third buffer area BA3. The buffer monitoring circuit 117_2 may periodically monitor the plurality of buffer areas BA1 to BA3. The buffer monitoring circuit 117_2 may monitor how much data are loaded onto the plurality of buffer areas BA1 to BA3. That is, the buffer monitoring circuit 117_2 may calculate the buffer occupation ratios of the plurality of buffer areas BA1 to BA3. For example, the buffer occupation ratio may indicate a ratio of the amount of loaded video data (or the amount of data stored in a buffer memory) and the amount of total video data.

The buffer monitoring circuit 117_2 may generate the buffer information BI. For example, the buffer information BI may include first to third buffer occupation ratios. The first buffer occupation ratio may indicate a buffer occupation ratio of the first buffer area BA1, the second buffer occupation ratio may indicate a buffer occupation ratio of the second buffer area BA2, and the third buffer occupation ratio may indicate a buffer occupation ratio of the third buffer area BA3. The first buffer occupation ratio (e.g., "1/2") may be greater than the third buffer occupation ratio (e.g., "1/5"), and the second buffer occupation ratio may be greater than the first buffer occupation ratio (e.g., "1/2").

The scheduler 117_1 may receive the buffer information BI from the buffer monitoring circuit 117_2. The scheduler 117_1 may schedule the first to third requests RQ1 to RQ3 based on the buffer information BI. The scheduler 117_1 may schedule which response to transmit first, based on the buffer information BI.

For example, the scheduler 117_1 may perform scheduling in order of the second request RQ2, the first request RQ1, and the third request RQ3, that is, in order from greatest to smallest. Because the second buffer occupation ratio is greater than the first buffer occupation ratio, scheduling may be made such that the second response REP2 corresponding to the second request RQ2 is transferred prior to the first response REP1 corresponding to the first request RQ1. Because the first buffer occupation ratio is greater than the third buffer occupation ratio, scheduling may be made such that the first response REP1 corresponding to the first request RQ1 is transferred prior to the third response REP3 corresponding to the third request RQ3.

The first storage device 100_1 may send responses based on a scheduling result. In operation S350, the first storage device 100_1 may send the second response REP2 to the second user equipment UE2. In operation S360, the first storage device 100_1 may send the first response REP1 to the first user equipment UE1. In operation S370, the first storage device 100_1 may send the third response REP3 to the third user equipment UE3.

In an embodiment, the QoE manager 117 may perform the scheduling operation only based on priorities. For example, because the first request RQ1 has the first level LV1, the second request RQ2 has the second level LV2, and the third request RQ3 has the third level LV3, the QoE manager 117 may perform scheduling in order of the first request RQ1, the second request RQ2, and the third request RQ3. That is, the QoE manager 117 may send the first response REP1, may then send the second response REP2, and may then send the third response REP3.

In contrast, like the embodiment of FIG. 8B, to overall improve the QoE, the QoE manager 117 may assign a greater weight to a buffer state, rather than a priority. That is, even though the priority of the first request RQ1 is higher than the priority of the second request RQ2, because the buffer occupation ratio of the second request RQ2 is greater than the buffer occupation ratio of the first request RQ1, the QoE manager 117 may send the second response REP2 prior to the first response REP1.

Figure 9:
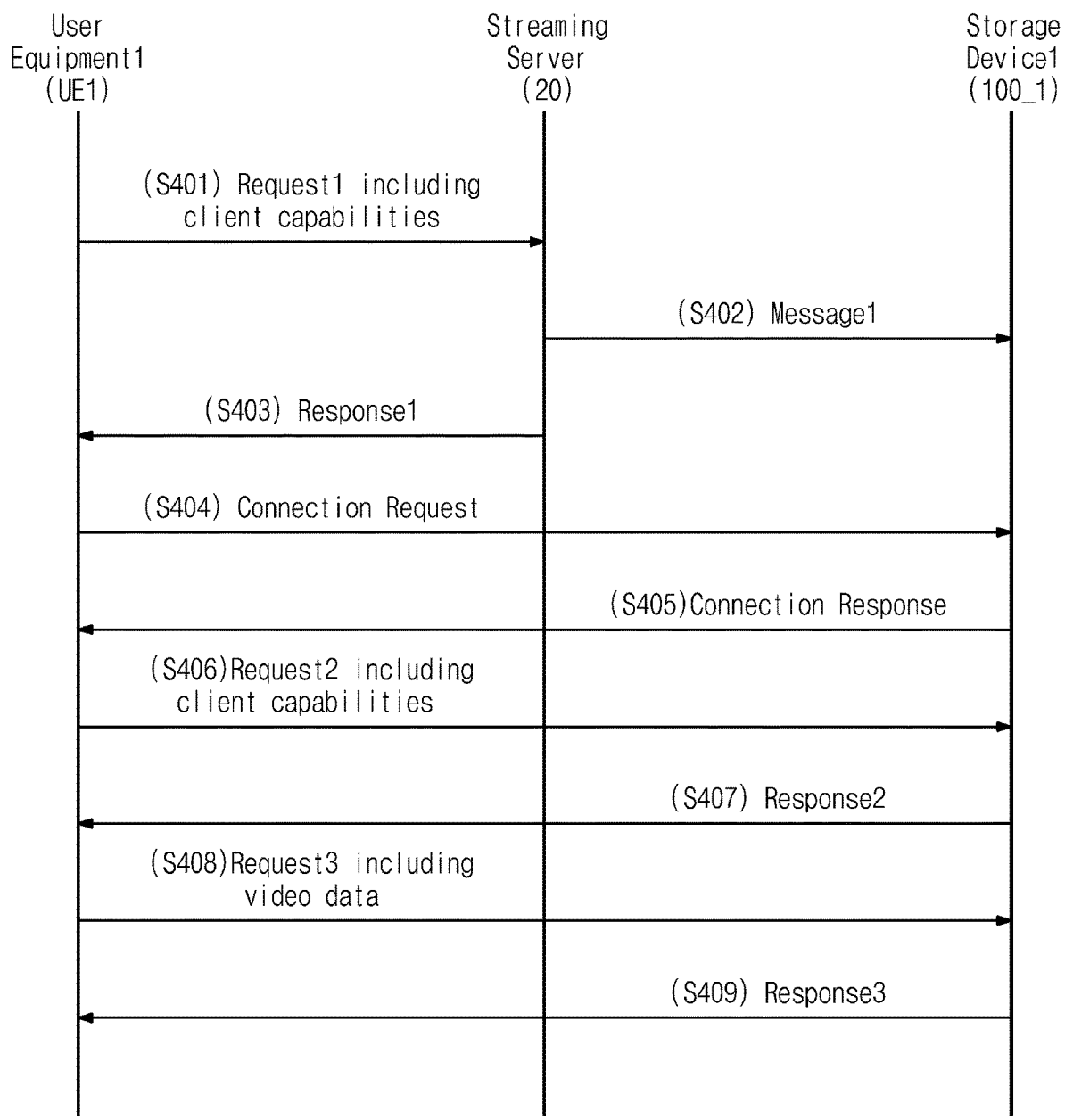
FIG. 9 is a flowchart illustrating an example of an operation of a streaming system of FIG. 1.

FIG. 9 is a flowchart illustrating an example of an operation of a streaming system of FIG. 1. Referring to FIGS. 1 and 9, the first storage device 100_1 may perform operation S401 to operation S408 to implement operation S110 of FIG. 5. That is, operation S110 of FIG. 5 may include operation S401 to operation S408. Operation S190 of FIG. 5 may correspond to operation S409.

In operation S401, the first user equipment UE1 may send a first request (e.g., an HTTP GET message) including client capabilities to the streaming server 20 over the network NT. For example, the HTTP GET message may include a header including a status message associated with the client capabilities. The streaming server 20 may receive the first request from first client equipment.

In operation S402, the streaming server 20 may send a first message to the first storage device 100_1 in response to the first request. The streaming server 20 may transfer the header included in the first request to the first storage device 100_1. That is, the streaming server 20 may send the PED message (i.e., the first message) including the status message associated with the client capabilities to the first storage In operation S403, the streaming server 20 may send a first response to the first user equipment UE1 over the network NT. For example, the streaming server 20 may generate an "HTTP 200 OK" message (i.e., the first response) including a body indicating the first storage device 100_1. The first user equipment UE1 may receive the first response.

In operation S404, the first user equipment UE1 may send a connection request to the first storage device 100_1 over the network NT in response to the first response. The first user equipment UE1 may generate a WebSocket connection request (i.e., the connection request). The first storage device 100_1 may receive the connection request.

In operation S405, the first storage device 100_1 may send a connection response to the first user equipment UE1 over the network NT in response to the connection request. For example, the connection response may include information about WebSocket connection accept.

In operation S406, the first user equipment UE1 may send a second request including the client capabilities to the first storage device 100_1 over the network NT. For example, the first user equipment UE1 may communicate the HTTP GET message (i.e., the second request) to the first storage device 100_1. For example, the HTTP GET message may include the header including the status message associated with the client capabilities. The first user equipment UE1 may send the second request to the first storage device 100_1 through the metrics or status message. The first storage device 100_1 may receive the second request.

In operation S407, the first storage device 100_1 may send a second response to the first user equipment UE1 over the network NT in response to the second request. For example, the first storage device 100_1 may generate an "HTTP 200 OK" message (i.e., the second response) including the body indicating capabilities of the first storage device 100_1. The first storage device 100_1 may send the second response through the PER message. The first user equipment UE1 may receive the second response.

In operation S408, the first user equipment UE1 may send a third request for video data to the first storage device 100_1 over the network NT. For example, the first user equipment UE1 may generate the HTTP GET message (i.e., the third request) including the header indicating video data. The first storage device 100_1 may receive the third request.

In operation S409, the first storage device 100_1 may send a response in response to the third request. For example, the first storage device 100_1 may generate the "HTTP 200 OK" message (i.e., the third response) including the body indicating the video data. The first user equipment UE1 may receive the third response.

Figure 10:
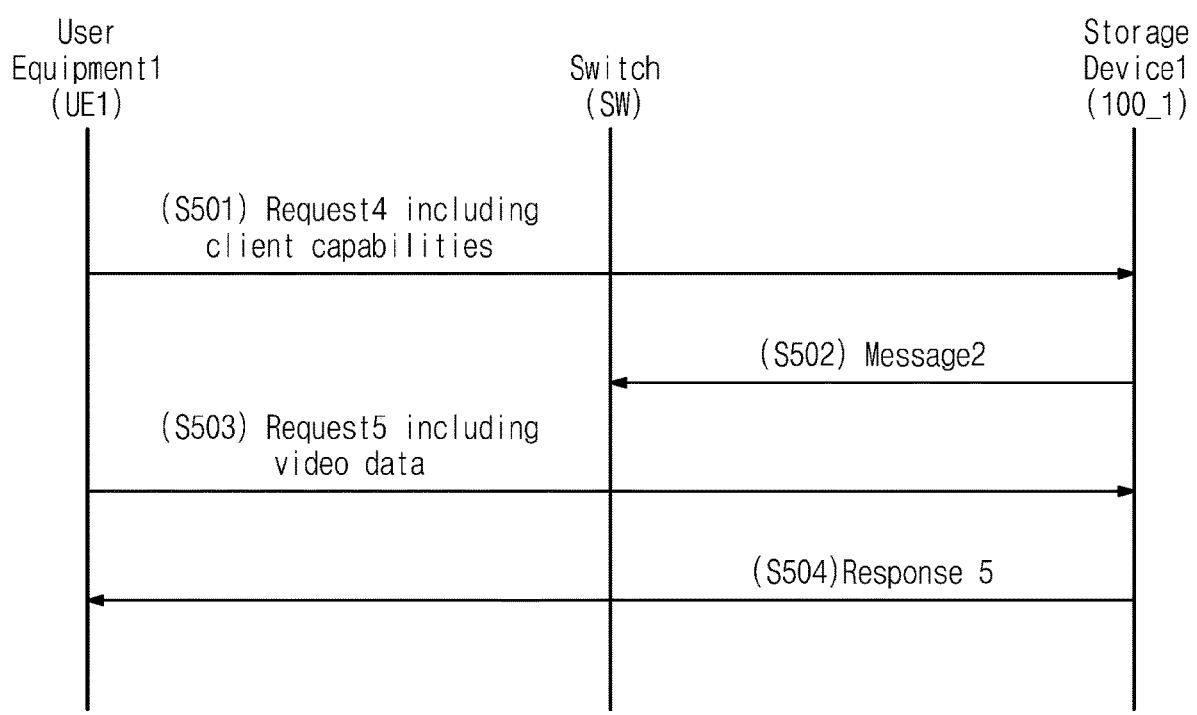
FIG. 10 is a flowchart illustrating an example of an operation of a streaming system of FIG. 1.

FIG. 10 is a flowchart illustrating an example of an operation of a streaming system of FIG. 1. Referring to FIGS. 1, 9, and 10, the streaming system 10 may perform operation S409 and may then perform operation S501. In operation S501, the first user equipment UE1 may send a fourth request including the client capabilities to the first storage device 100_1 over the network NT. For example, the first user equipment UE1 may communicate the HTTP GET message (i.e., the fourth request) to the first storage device 100_1. For example, the HTTP GET message may include the header including the status message associated with the changed client capabilities. The first user equipment UE1 may send the fourth request to the first storage device 100_1 through the metrics or status message. The first storage device 100_1 may receive the fourth request.

In operation S502, the first storage device 100_1 may send a second message to the switch SW of the network NT. For example, the first storage device 100_1 may detect that information included in the client capabilities is changed, by comparing the client capabilities included in the second request received in operation S406 and the client capabilities included in the fourth request. The first storage device 100_1 may recognize that information (or status) associated with the network situation or the first storage device 100_1 is changed. As such, the first storage device 100_1 may send the PED message (i.e., the second message) to the switch SW. The first storage device 100_1 may communicate with the switch SW through the PED message. The first storage device 100_1 may control the switch SW through the PED message.

In operation S503, the first user equipment UE1 may send a fifth request for video data to the first storage device 100_1 over the network NT. For example, the first user equipment UE1 may generate the HTTP GET message (i.e., the fifth request) including the header indicating video data. The first storage device 100_1 may receive the fifth request.

In operation S504, the first storage device 100_1 may send a fifth response in response to the fifth request. For example, the first storage device 100_1 may generate the "HTTP 200 OK" message (i.e., the fifth response) including the body indicating the video data. The first user equipment UE1 may receive the fifth response.

Figure 11:
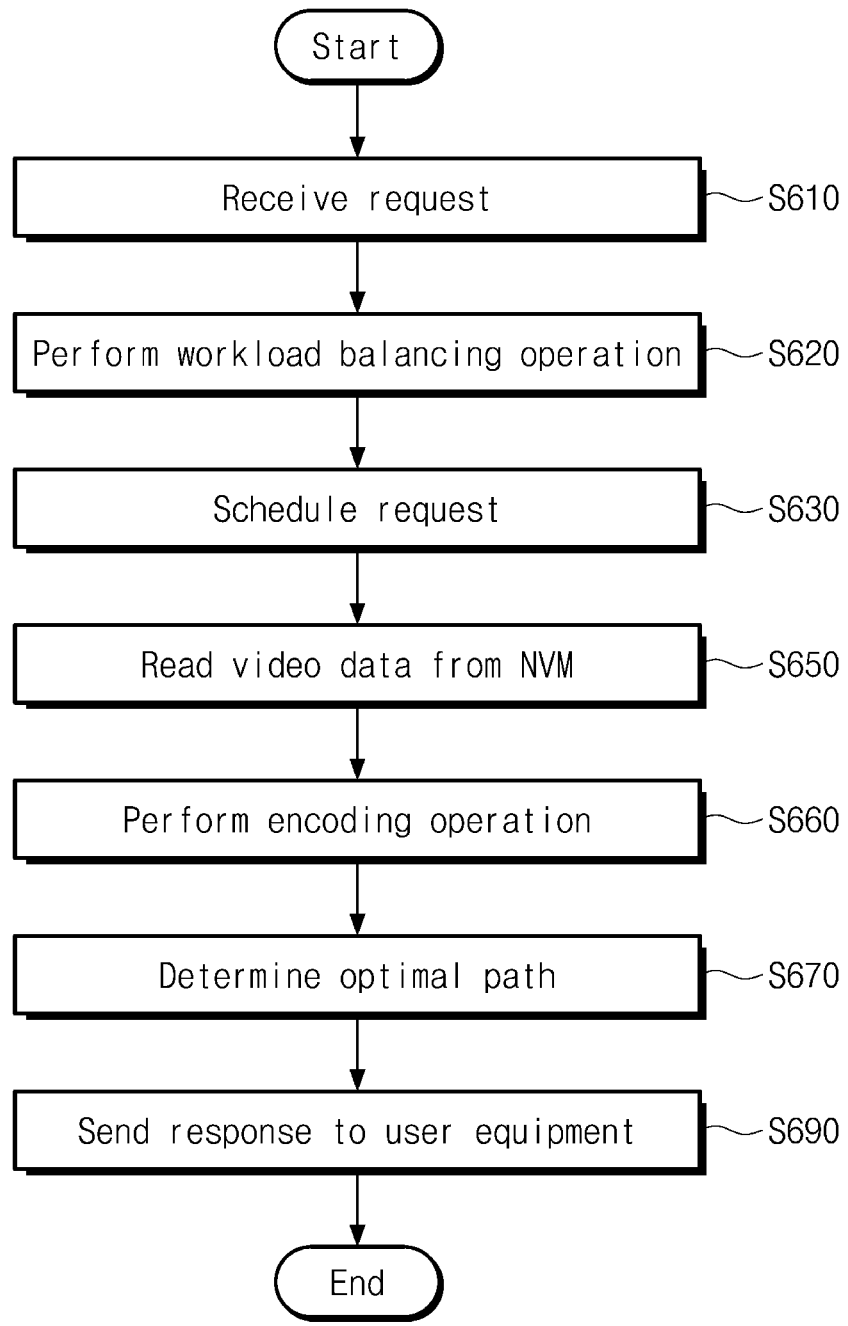
FIG. 11 is a flowchart illustrating an example of an operation of a storage device of FIG. 2.

FIG. 11 is a flowchart illustrating an example of an operation of a storage device of FIG. 2. Referring to FIGS. 2, 5, and 11, the first storage device 100_1 may perform operation S610 to operation S690. Operation S610, operation S630, operation S650, operation S670, and operation S690 are identical or similar to operation S110, operation S130, operation S150, operation S170, and operation S190 of FIG. 5, and thus, additional description will be omitted to avoid redundancy.

In operation S610, the first storage device 100_1 may receive a request. For example, the first storage device 100_1 may receive a first request for first video data from the first user equipment UE1, may receive a second request for second video data from the second user equipment UE2, and may receive a third request for third video data from the third user equipment UE3.

In operation S620, the first storage device 100_1 may perform the workload balancing operation. The workload (or requests) may be balanced (or distributed) between the plurality of storage devices 100_1 to 100_n in the storage cluster 30. To maximize the efficient utilization of resources and to overall improve the QoE, the workload may be again allocated from one storage device to another storage device in the storage cluster 30. That is, the streaming service may be provided by a storage device that is different from a storage device receiving a request from the plurality of user equipments UE1 to UEm.

For example, the first storage device 100_1 may receive the second request from the second user equipment UE2 through the streaming server 20. The first storage device 100_1 may perform the workload balancing operation with the remaining storage devices 100_2 to 100_n in the storage cluster 30 through the PED message. The first storage device 100_1 may communicate with the remaining storage devices 100_2 to 100_n through the PED message and may again allocate the second request to the second storage device 100_2 through the PED message.

In operation S630, the first storage device 100_1 may schedule a plurality of requests. Because the second request is already redistributed to the second storage device 100_2, the first storage device 100_1 may perform the scheduling operation on the first request and the third request.

In operation S650, the first storage device 100_1 may read video data from the nonvolatile memory device 120. In operation S660, the first storage device 100_1 may perform the encoding operation (or transcoding operation) on the video data. The first storage device 100_1 may perform the encoding operation on the first video data based on a codec type included in the first request. The first storage device 100_1 may perform the encoding operation on the third video data based on a codec type included in the third request.

In operation S670, the first storage device 100_1 may determine an optimal transfer path of the video data. In operation S690, the first storage device 100_1 may send a response including the video data to the user equipment. For example, the first storage device 100_1 may send a response corresponding to the first request to the first user equipment UE1 and may send a response corresponding to the third request to the third user equipment UE3.

Each of the plurality of storage devices 100_1 to 100_n of the present disclosure may perform the workload balancing operation without intervention of the streaming server 20 by executing the application offloaded from the streaming server 20. As such, because the burden on computation to be performed by the streaming server 20 may be alleviated, the overall performance of the streaming system 10 may be improved.

Figure 12:
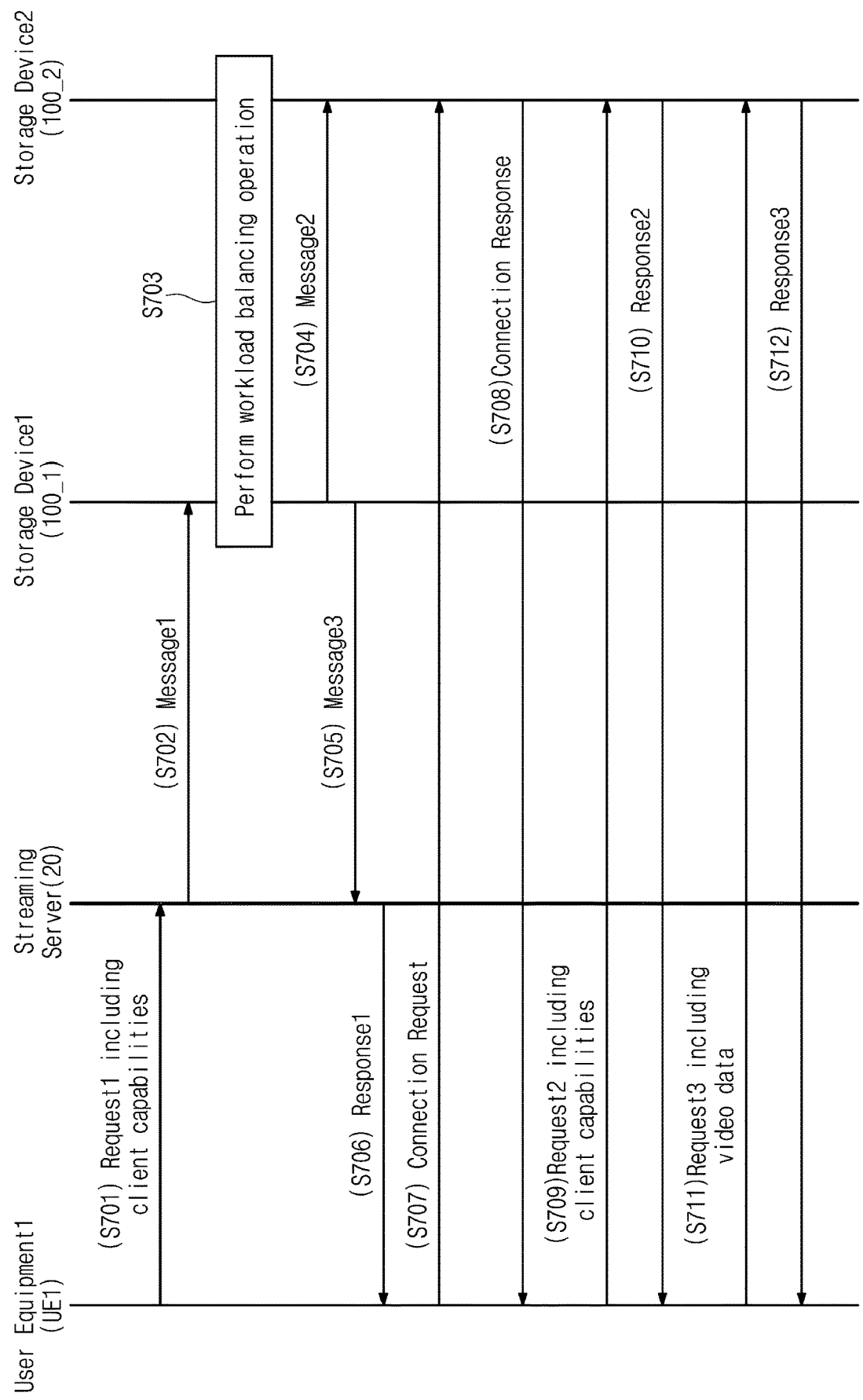
FIG. 12 is a flowchart illustrating an example of an operation of a streaming system of FIG. 1.

FIG. 12 is a flowchart illustrating an example of an operation of a streaming system of FIG. 1. Referring to FIGS. 1, 9, and 12, in operation S701, the first user equipment UE1 may send the first request (e.g., the HTTP GET message) including the client capabilities to the streaming server 20 over the network NT. In operation S702, the streaming server 20 may send a first message to the first storage device 100_1 in response to the first request. Operation S701 and operation S702 are identical or similar to operation S401 and operation S402 of FIG. 9, and thus, additional description will be omitted to avoid redundancy. In operation S703, the storage cluster 30 may perform the workload balancing operation. For example, the first storage device 100_1 and the second storage device 100_2 may perform the workload balancing operation through the PED message. Through the workload balancing operation between the first storage device 100_1 and the second storage device 100_2, which storage device efficiently processes the first request to improve the QoE may be determined. Through the workload balancing operation between the first storage device 100_1 and the second storage device 100_2, that the first request is processed by the second storage device 100_2 may be determined.

In operation S704, the first storage device 100_1 may send a second message to the second storage device 100_2 in response to a workload balancing result. The first storage device 100_1 may transfer the first message received from the streaming server 20 as the second message without modification. That is, the first storage device 100_1 may send the PED message (i.e., the second message) including the status message associated with the client capabilities to the second storage device 100_2.

In operation S705, the first storage device 100_1 may send a third message to the streaming server 20. The first storage device 100_1 may notify the streaming server that the first request is reallocated to the second storage device 100_2, through the PED message (i.e., the second message).

In operation S706, the streaming server 20 may send a first response to the first user equipment UE1 over the network NT. For example, the streaming server 20 may generate the "HTTP 200 OK" message (i.e., the first response) including the body indicating the second storage device 100_2. The first user equipment UE1 may receive the first response.

In an embodiment, because the first request is reallocated to the second storage device 100_2, the first storage device 100_1 may not process the first request. Instead of the first storage device 100_1, the second storage device 100_2 may perform the WebSocket connection with the first user equipment UE1.

In operation S707, the first user equipment UE1 may send the connection request to the second storage device 100_2 over the network NT in response to the first response. The first user equipment UE1 may generate the WebSocket connection request (i.e., the connection request). The second storage device 100_2 may receive the connection request.

In operation S708, the second storage device 100_2 may send the connection response to the first user equipment UE1 over the network NT in response to the connection request. For example, the connection response may include information about WebSocket connection accept.

In operation S709, the first user equipment UE1 may send a second request including the client capabilities to the second storage device 100_2 over the network NT. For example, the first user equipment UE1 may communicate the HTTP GET message (i.e., the second request) to the second storage device 100_2. For example, the HTTP GET message may include the header including the status message associated with the client capabilities. The first user equipment UE1 may send the second request to the second storage device 100_2 through the metrics or status message. The second storage device 100_2 may receive the second request.

In operation S710, the second storage device 100_2 may send a second response to the first user equipment UE1 over the network NT in response to the second request. For example, the second storage device 100_2 may generate the "HTTP 200 OK" message (i.e., the second response) including the body indicating capabilities of the second storage device 100_2. The second storage device 100_2 may send the second response through the PER message. The first user equipment UE1 may receive the second response.

In operation S711, the first user equipment UE1 may send a third request for video data to the second storage device 100_2 over the network NT. For example, the first user equipment UE1 may generate the HTTP GET message (i.e., the third request) including the header indicating video data. The second storage device 100_2 may receive the third request.

In operation S712, the second storage device 100_2 may send a third response in response to the third request. For example, the second storage device 100_2 may generate the "HTTP 200 OK" message (i.e., the third response) including the body indicating the video data. The first user equipment UE1 may receive the third response.

Figure 13A:
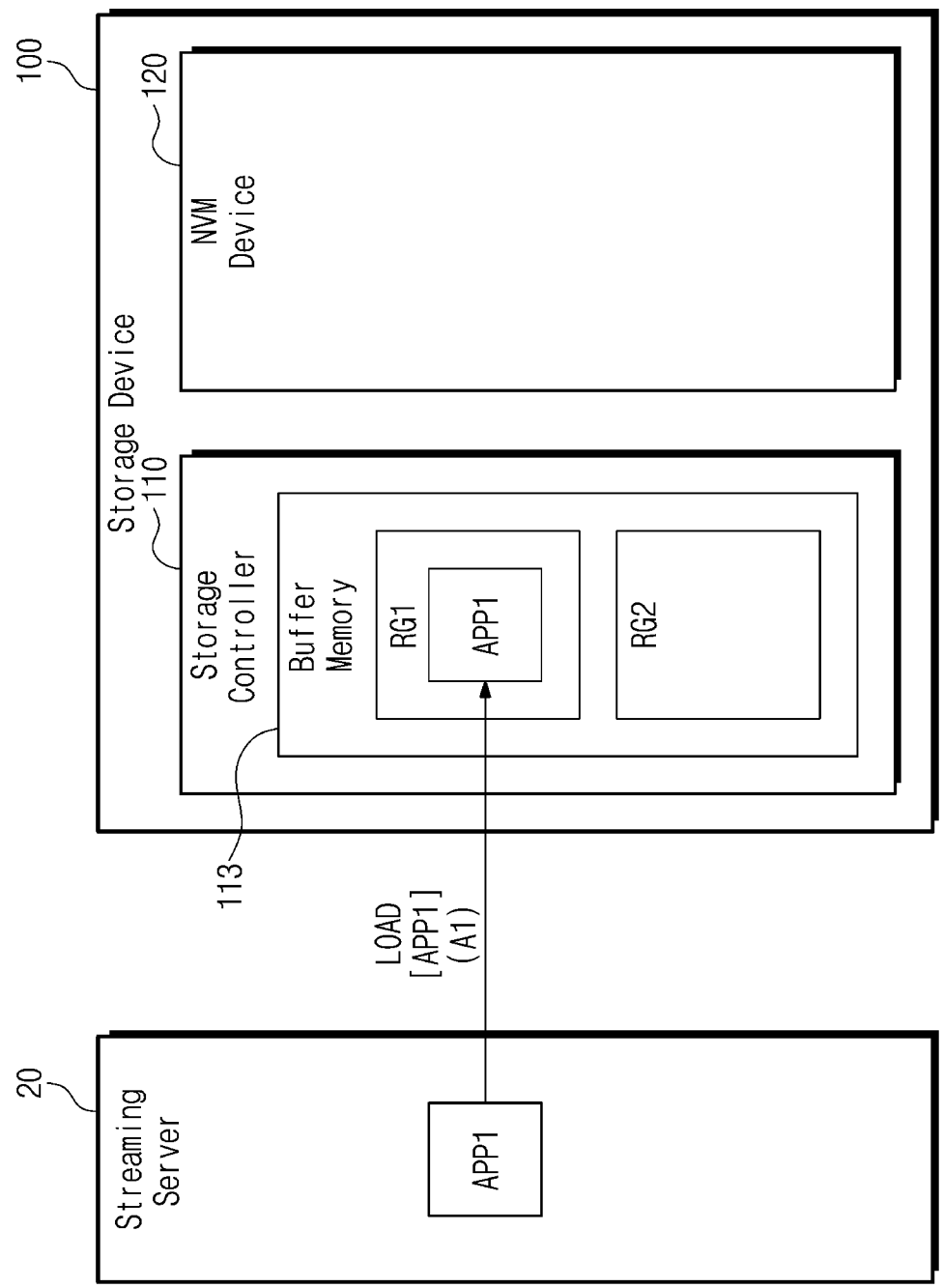
FIGS. 13A to 13C are diagrams for describing an operation of a storage device according to a control of a streaming server.
Figure 13B:
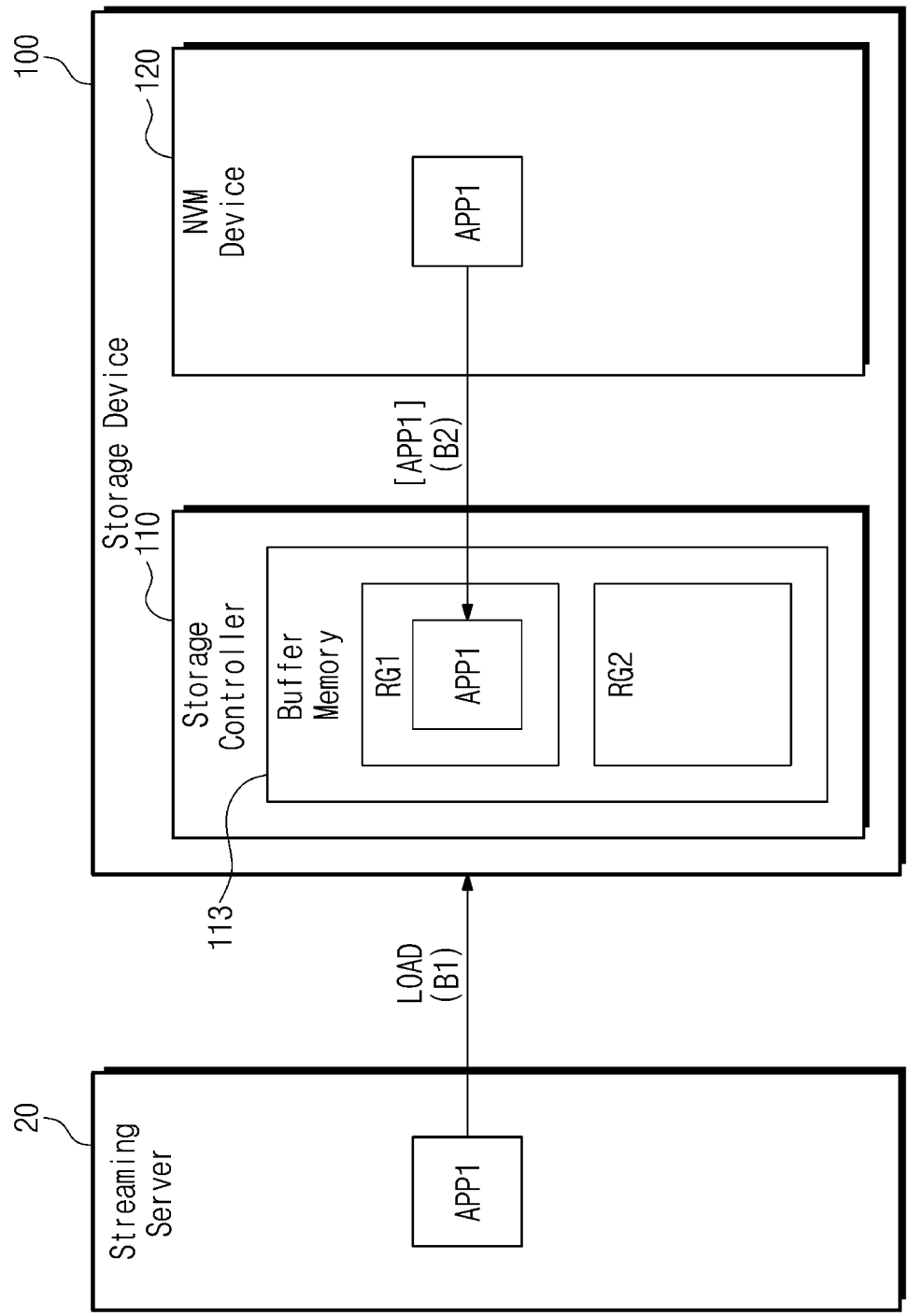
Figure 13C:
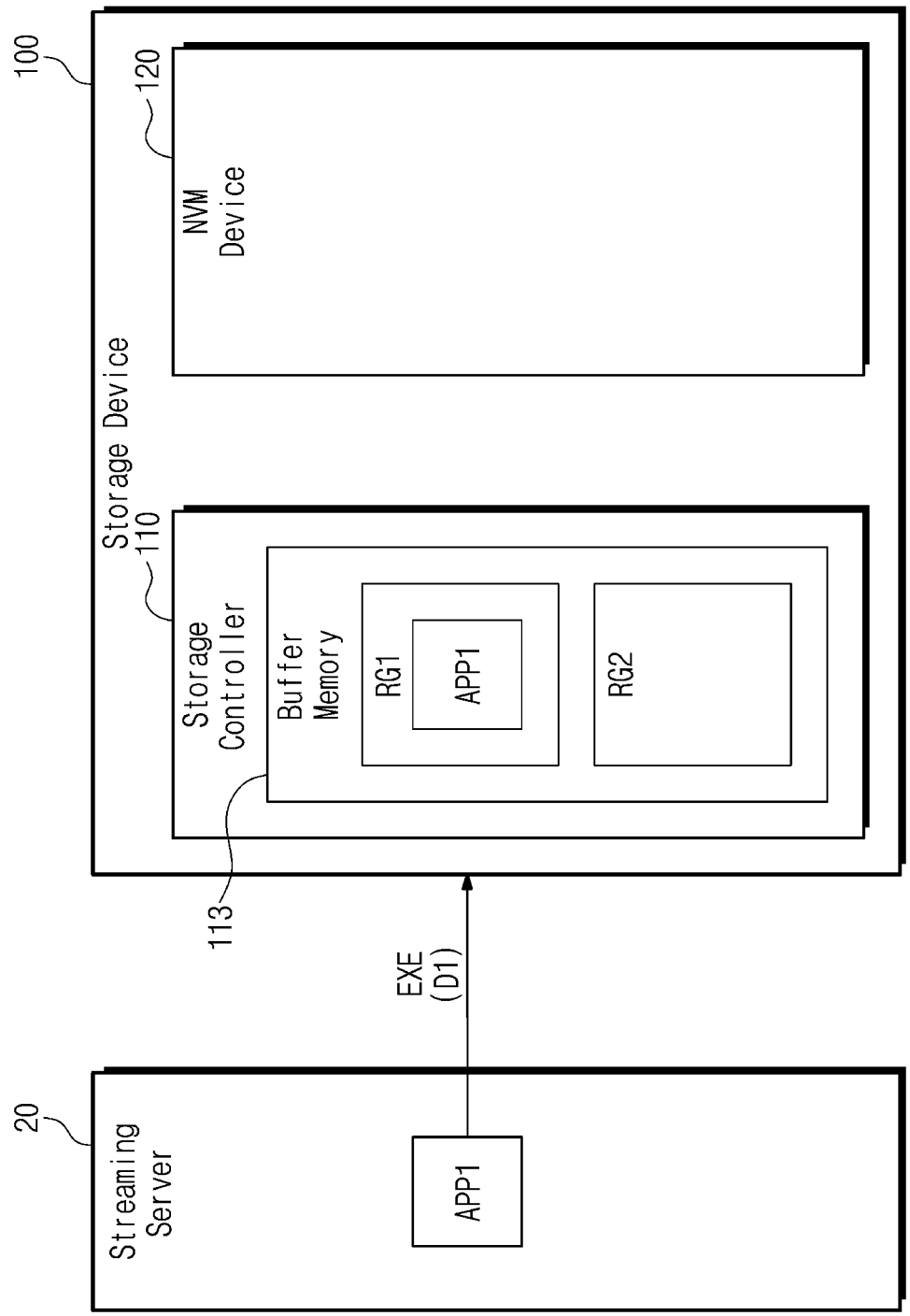

FIGS. 13A to 13C are diagrams for describing an operation (e.g., internal application driving) of a storage device according to a control of a streaming server. Some components will be omitted for brevity of drawing and for convenience of description, but the present disclosure is not limited thereto.

Referring to FIGS. 13A to 13C, in an embodiment, the streaming server 20 and the storage device 100 may communicate with each other based on the given interface standard. The given interface standard may be the NVMe interface standard, but the present disclosure is not limited thereto. The storage device 100 may include the storage controller 110 and the nonvolatile memory device 120. The storage controller 110 may include the buffer memory 113.

According to an embodiment, the buffer memory 113 may include a first region RG1 and a second region RG2. The first region RG1 may be configured to store information or a program code associated with an internal application that is driven on the storage controller 110. The second region RG2 may be configured to store data that are managed or used by the internal application driven on the storage controller 110.

In an embodiment, the first and second regions RG1 and RG2 may be physically or logically divided in the buffer memory 113. In an embodiment, the first and second regions RG1 and RG2 may be divided or managed by the storage controller 110, and information about the first and second regions RG1 and RG2 may be provided to the streaming server 20. In an embodiment, the first and second regions RG1 and RG2 may be managed or divided by the streaming server 20.

In an embodiment, the streaming server 20 may be configured to load the internal application to be executed on the storage device 100. For example, as illustrated in FIG. 13A, the streaming server 20 may include a first application APP1 or a program code associated with the first application APP1. The streaming server 20 may load the first application APP1 onto the buffer memory 113 of the storage controller 110 by sending a load command LOAD and the first application APP1 to the storage controller 110 (Phase A1). The storage controller 110 may drive the first application APP1 stored in the first region RG1 of the buffer memory 113.

Alternatively, as illustrated in FIG. 13B, the first application APP1 may be stored in the nonvolatile memory device 120. In this case, the streaming server 20 may send the load command LOAD to the storage controller 110 (Phase B1). In response to the load command LOAD, the storage controller 110 may load the first application APP1 stored in the nonvolatile memory device 120 onto the first region RG1 of the buffer memory 113 (Phase B2).

In an embodiment, under control of the streaming server 20, the storage controller 110 may be configured to drive the internal application to perform various operations. For example, as illustrated in FIG. 13C, the streaming server 20 may send an execute command EXE to the storage controller 110 (Phase D1). The execute command EXE may be a command for initiating the execution of the first application APP1 by the storage controller 110. The storage controller 110 may execute the first application APP1 in response to the execute command EXE. For example, the streaming server 20 may transfer a request received from the plurality of user equipments UE1 to UEm to the storage device 100 through the PED message. The streaming server 20 may provide the streaming service to the plurality of user equipments UE1 to UEm based on the method described with reference to FIGS. 1 to 12. The storage device 100 may drive the internal application configured to perform various operations (e.g., a workload distribution operation and a scheduling operation).

Figure 14:
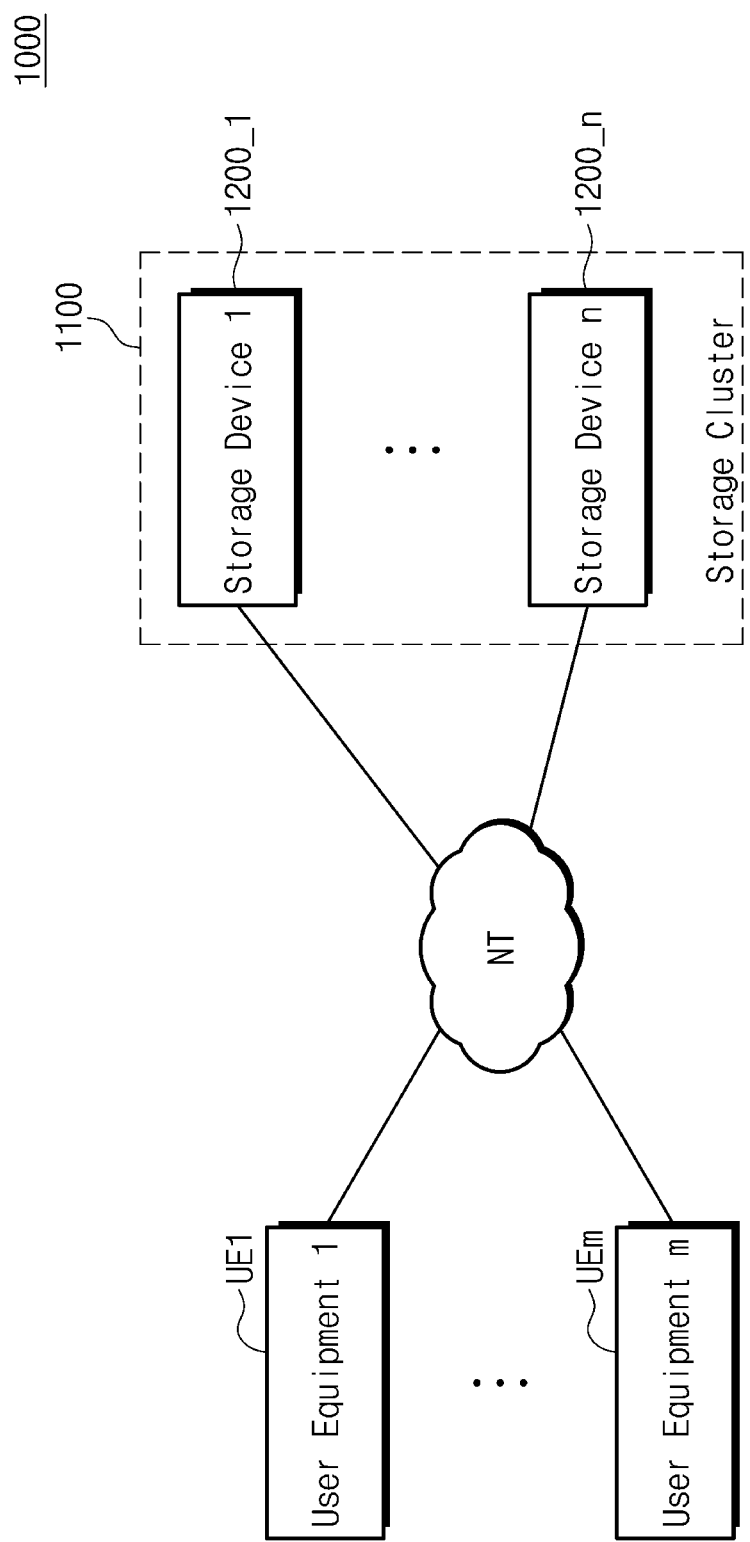
FIG. 14 is a block diagram illustrating a streaming system according to an embodiment of the present disclosure.

FIG. 14 is a block diagram illustrating a streaming system according to an embodiment of the present disclosure. Referring to FIGS. 1 and 14, a streaming system 1000 may include the plurality of user equipments (or client equipments) UE1 to UEm, the network NT, a storage cluster 1100. The storage cluster 1100 may include a plurality of storage devices 1200_1 to 1200_n.

The streaming system 10 of FIG. 1 may include the streaming server 20. In contrast, the streaming system 1000 of FIG. 14 may not include a streaming server. The streaming system 1000 may be a server-less system. The plurality of user equipments UE1 to UEm may send requests to the storage cluster 1100 over the network NT. The plurality of user equipments UE1 to UEm may directly communicate with the storage cluster 1100 without intervention of the streaming server. The plurality of storage devices 100_1 to 100_n may provide the streaming service to the plurality of user equipments UE1 to UEm based on the method described with reference to FIGS. 1 to 13.

Figure 15:
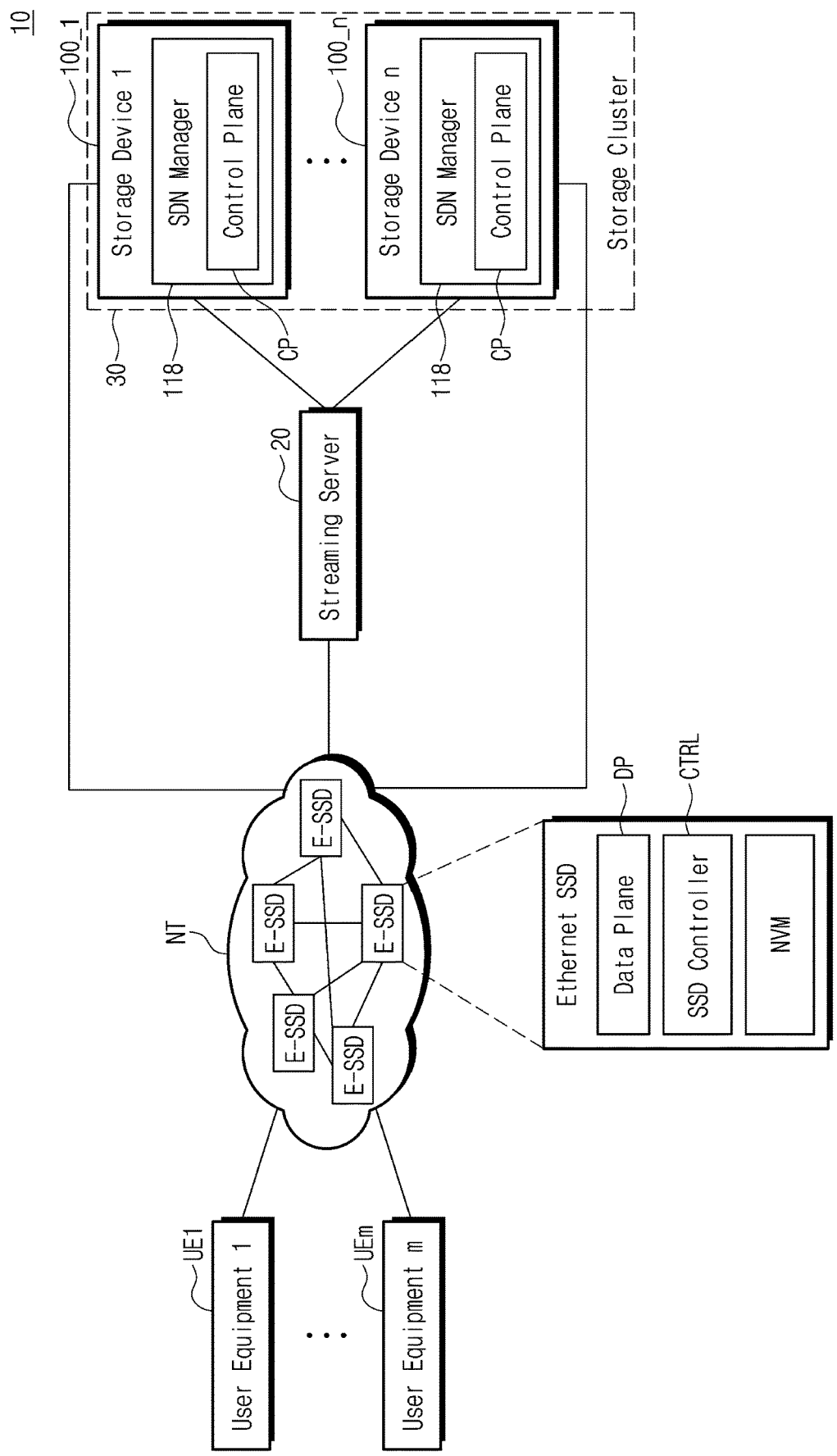
FIG. 15 is a block diagram illustrating a streaming system of FIG. 1 in detail.

FIG. 15 is a block diagram illustrating a streaming system of FIG. 1 in detail. Referring to FIGS. 1, 4, and 15, the streaming system 10 may include the plurality of user equipments UE1 to UEm, the network NT, the streaming server 20, and the storage cluster 30. The storage cluster 1100 may include the plurality of storage devices 100_1 to 100_n. Each of the plurality of storage devices 100_1 to 100_n may include the SDN manager 118. The SDN manager 118 may include a control plane CP.

In an embodiment, the network NT may include a plurality of Ethernet solid state drives E-SSD (or a plurality of storage devices). The Ethernet SSD may include the data plane DP, an SSD controller CTRL, and a nonvolatile memory NVM. For convenience of description, additional description associated with the components described above will be omitted to avoid redundancy.

The network NT of FIG. 4 may include the plurality of switches SW. In contrast, the network NT of FIG. 15 may include the plurality of Ethernet SSDs E-SSD. The plurality of Ethernet SSDs E-SSD may perform a role of a cache of the storage cluster The Ethernet SSD E-SSD may store a portion of content (i.e., video data) stored in the plurality of storage devices 100_1 to 100_n in the nonvolatile memory NVM. The Ethernet SSD E-SSD may provide a portion of content stored in the nonvolatile memory NVM to the plurality of user equipments UE1 to UEm, instead of the storage cluster 30.

According to the present disclosure, a storage device may drive an application offloaded from a streaming server, may set a network transfer path, and provide content to a user equipment. As such, a storage device providing improved QoE, an operating method of the storage device, and a streaming system including the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device, comprising:
   a nonvolatile memory device; and
   a storage controller configured to control the nonvolatile memory device, said storage controller comprising:
      a buffer memory;
      a quality of experience (QoE) manager configured to schedule a request received from an external user equipment, based on storage device information, which includes buffer information, and network information; and
      a software-defined networking (SDN) manager configured to set a network transfer path to the external user equipment, which is associated with video data corresponding to the request; and
      wherein the buffer information includes information about a buffer occupation ratio of the video data loaded onto the buffer memory from the nonvolatile memory device.

2. The storage device of claim 1, wherein the storage controller performs a workload balancing operation on the request.

3. The storage device of claim 2, wherein the storage controller further comprises a server and network-associated DASH (SAND) manager configured to process a SAND-based message; and wherein the storage controller sends a parameters enhancing delivery (PED) message to an external storage device through the SAND manager to perform the workload balancing operation.

4. The storage device of claim 2, wherein the storage controller is configured to drive an application offloaded from an external streaming server to perform the workload balancing operation.

5. The storage device of claim 1,
   wherein the storage device information further includes latency information; and
   wherein the latency information includes information about a time taken to load the video data onto the buffer memory from the nonvolatile memory device.

6. The storage device of claim 5, wherein the storage controller further comprises:
   an accelerator configured to perform an encoding operation, a compression operation, and/or a transcoding operation on the video data; and
   wherein the latency information includes information about a time taken for the accelerator to perform the encoding operation, the compression operation, and/or the transcoding operation.

7. The storage device of claim 1, wherein the SDN manager includes a control plane configured to generate network connection information; and wherein the SDN manager sends the network connection information to a data plane of an external switch to establish a connection between the storage device and the external user equipment.

8. The storage device of claim 1, wherein the storage controller further comprises:
   a server and network-associated DASH (SAND) manager configured to process a SAND-based message; and
   wherein the SAND manager is configured to: (i) send a parameters enhancing reception (PER) message to the external user equipment, (ii) send a parameters enhancing delivery (PED) message to an external streaming server and/or an external storage device, and (iii) receive a metrics and status message from the external user equipment.

9. The storage device of claim 1,
   wherein the storage controller further comprises a buffer memory;
   wherein the QoE manager comprises:
      a buffer monitoring circuit configured to monitor a buffer occupation ratio, which indicates a data amount by which video data corresponding to the request are loaded onto the buffer memory from the nonvolatile memory device;
      a latency predicting circuit configured to calculate a nonvolatile memory access time, which indicates an elapsed time during which the video data are loaded onto the buffer memory from the nonvolatile memory device; and
      a scheduler configured to schedule the request based on a scheduling parameter; and
   wherein the scheduling parameter includes at least one of the request, the network information, the nonvolatile memory access time, and the buffer occupation ratio.

10. The storage device of claim 9, wherein the scheduler assigns a weight to the scheduling parameter and schedules the request based on the scheduling parameter and the weight.

11. The storage device of claim 1,
    wherein the storage controller further includes a host interface circuit;
    wherein the host interface circuit comprises:
       an Ethernet interface circuit configured to communicate with the external user equipment over a network; and
       a NVM express (NVMe) interface circuit configured to communicate with an external streaming server.

12. A method of operating a storage device having a nonvolatile memory device and a storage controller therein, comprising:
    receiving a request, which requires video data, from an external user equipment;
    scheduling the request based on network information and storage device information;
    reading the video data corresponding to the request from the nonvolatile memory device;
    determining a network transfer path, which is associated with the video data, to the external user equipment; and
    sending a response including the video data to the external user equipment,
    wherein the storage controller further comprises a buffer memory;
    wherein the storage device information includes buffer information; and
    wherein the buffer information includes information about a buffer occupation ratio of the video data loaded onto the buffer memory from the nonvolatile memory device.

13. The method of claim 12, wherein said receiving a request comprises:
    receiving a parameters enhancing delivery (PED) message from an external streaming server;

receiving a WebSocket connection request from the external user equipment;
sending a response including information about WebSocket connection accept to the external user equipment;
receiving an HTTP GET request including client capabilities from the external user equipment;
sending a parameters enhancing reception (PER) message to the external user equipment; and
receiving an HTTP GET request including a header that indicates the video data, from the external user equipment.

14. The method of claim 13, further comprising:
receiving an HTTP GET request including changed client capabilities from the external user equipment;
sending a PED message to an external switch;
receiving an HTTP GET request including a header indicating second video data from the external user equipment; and
sending a response including the second video data to the external user equipment.

15. The method of claim 12, further comprising:
receiving a second request requiring video data provided from the external user equipment;
communicating with an external storage device to perform a workload balancing operation;
sending a parameters enhancing delivery (PED) message reallocating the second request to an external storage device; and
notifying an external streaming server that the second request is reallocated to the external storage device, using another PED message.

16. The method of claim 12,
wherein the storage device information further includes latency information; and
wherein the latency information includes information about a time taken to load the video data onto the buffer memory from the nonvolatile memory device.

17. A storage device, comprising:
a nonvolatile memory device; and
a storage controller configured to control the nonvolatile memory device, said storage controller comprising: a quality of experience (QoE) manager configured to perform a scheduling operation on a request received from an external user equipment, based on storage device information, and network information; and
a software-defined networking (SDN) manager configured to perform a network transfer path selecting operation, which is associated with video data corresponding to the request, to the external user equipment;
wherein the storage controller is configured to drive an application offloaded from an external streaming server to perform the scheduling operation and network transfer path selecting operation on the request;
wherein the storage controller further comprises a buffer memory;
wherein the storage device information includes buffer information;
wherein the buffer information includes information about a buffer occupation ratio of the video data loaded onto the buffer memory from the nonvolatile memory device.

18. The storage device of claim 17,
wherein the storage device information further includes latency information; and
wherein the latency information includes information about a time taken to load the video data onto the buffer memory from the nonvolatile memory device,
wherein the QoE manager is configured to:
monitor the buffer information on the video data corresponding to the request,
calculate a nonvolatile memory access time corresponding to the latency information, and
schedule the request based on a scheduling parameter,
wherein the scheduling parameter includes at least one of the request, the network information, the nonvolatile memory access time, and the buffer occupation ratio.

19. The storage device of claim 17, wherein the SDN manager includes a control plane configured to generate network connection information; and wherein the SDN manager sends the network connection information to a data plane of an external switch to establish a connection between the storage device and the external user equipment.

20. The storage device of claim 17, wherein the storage controller further comprises:
a server and network-associated DASH (SAND) manager configured to process a SAND-based message; and
wherein the SAND manager is configured to: (i) send a parameters enhancing reception (PER) message to the external user equipment, (ii) send a parameters enhancing delivery (PED) message to an external streaming server and/or an external storage device, and (iii) receive a metrics and status message from the external user equipment.

* * * * *